US005799305A

United States Patent [19]

Bortvedt et al.

[11] Patent Number: 5,799,305
[45] Date of Patent: Aug. 25, 1998

[54] METHOD OF COMMITMENT IN A DISTRIBUTED DATABASE TRANSACTION

[75] Inventors: Gerald K. Bortvedt, Beaverton; Robert H. Gerber, Portland, both of Oreg.

[73] Assignee: Informix Software, Inc., Menlo Park, Calif.

[21] Appl. No.: 552,058

[22] Filed: Nov. 2, 1995

[51] Int. Cl.$^6$ .............................. G06F 17/00; G06F 15/00
[52] U.S. Cl. ........................... 707/10; 707/9; 707/7; 707/8; 395/200.05; 395/200.11; 395/200.15; 395/200.03
[58] Field of Search ........................ 395/610, 609, 395/618, 617, 200.11, 200.3, 200.05, 200.15; 707/10, 9, 7, 8

[56] References Cited

U.S. PATENT DOCUMENTS

| | | | |
|---|---|---|---|
| 4,569,015 | 2/1986 | Dolev et al. | 364/200 |
| 4,881,166 | 11/1989 | Thompson et al. | 364/200 |
| 4,949,251 | 8/1990 | Griffin et al. | 364/200 |
| 5,065,311 | 11/1991 | Masai et al. | 364/200 |
| 5,165,031 | 11/1992 | Pruul et al. | 395/575 |
| 5,170,480 | 12/1992 | Mohan et al. | 395/600 |
| 5,193,162 | 3/1993 | Bordsen et al. | 395/425 |
| 5,201,044 | 4/1993 | Frey et al. | 395/575 |
| 5,212,787 | 5/1993 | Baker et al. | |
| 5,212,788 | 5/1993 | Lomet et al. | 395/600 |
| 5,241,675 | 8/1993 | Sheth et al. | 395/600 |
| 5,257,366 | 10/1993 | Adair et al. | 395/600 |
| 5,258,982 | 11/1993 | Britton et al. | 370/110.1 |
| 5,263,155 | 11/1993 | Wang | 395/600 |
| 5,280,612 | 1/1994 | Lorie et al. | 395/600 |
| 5,287,496 | 2/1994 | Chen et al. | 395/600 |
| 5,291,594 | 3/1994 | Sekiguchi et al. | 395/600 |

(List continued on next page.)

FOREIGN PATENT DOCUMENTS 0 567 999 A2  11/1993  European Pat. Off.
0 578 406 A1  1/1994   European Pat. Off.

OTHER PUBLICATIONS

Philip A. Bernstein, "Distributed transaction processing", 1989.

Philip A. Bernstein, "Distributed transaction recovery", 1989.

Jim Gray, "Notes on Data Base Operating Systems", 1977, IBM Research Laboratory, San Jose, CA.

Tim Gray et al., "Transaction Processing Concepts & Techniques", 1993.

Philip A. Bernstein et al., *Concurrency Control and recovery in database systems*, Addison–Wesley Publishing Company, 1987, pp. 217–261.

*Primary Examiner*—Thomas G. Black
*Assistant Examiner*—Jean R. Homere
*Attorney, Agent, or Firm*—Fish & Richardson P.C.

[57] ABSTRACT

A method for committing a distributed transaction in a distributed database system. The database system includes an interval coordinator, a plurality of database server programs, called coservers, and at least one transaction log. More than one coserver can operate on a single computer or node, and the coservers could share a transaction log. The interval coordinator sends each coserver a succession of interval messages, and each coserver flushes its associated transaction log to non-volatile storage in response. After flushing its transaction log, each coserver transmits a closure message to the interval coordinator. The coservers maintain a state which identifies the most recently received interval message. Each distributed transaction includes an owner and a non-owner, or helper. For a transaction, the owner transmits a request message to the helper identifying an operation in the distributed transaction for the coserver to execute. Upon execution of the operation, the coserver transmits a completion message to the owner with a tag identifying the most recently received interval message. After receiving said completion message, the owner transmits an eligibility message for the transaction to the interval coordinator. Then the interval coordinator writes a commit state for the transaction to stable storage. Then the interval coordinator sends the owner and helper a commit message for the transaction.

9 Claims, 17 Drawing Sheets

U.S. PATENT DOCUMENTS

| | | | |
|---|---|---|---|
| 5,329,626 | 7/1994 | Klein et al. | 395/375 |
| 5,333,303 | 7/1994 | Mohan | 395/575 |
| 5,335,343 | 8/1994 | Lampson et al. | 395/575 |
| 5,363,121 | 11/1994 | Freund | 395/600 |
| 5,371,886 | 12/1994 | Britton et al. | 395/600 |
| 5,390,302 | 2/1995 | Johnson et al. | 395/325 |
| 5,398,336 | 3/1995 | Tantry et al. | 395/600 |
| 5,414,840 | 5/1995 | Rengarajan et al. | 395/600 |
| 5,428,782 | 6/1995 | White | 395/650 |
| 5,432,926 | 7/1995 | Citron et al. | 395/575 |
| 5,561,763 | 10/1996 | Eto et al. | 395/183.11 |
| 5,581,749 | 12/1996 | Hossain et al. | 395/600 |

FIG._1
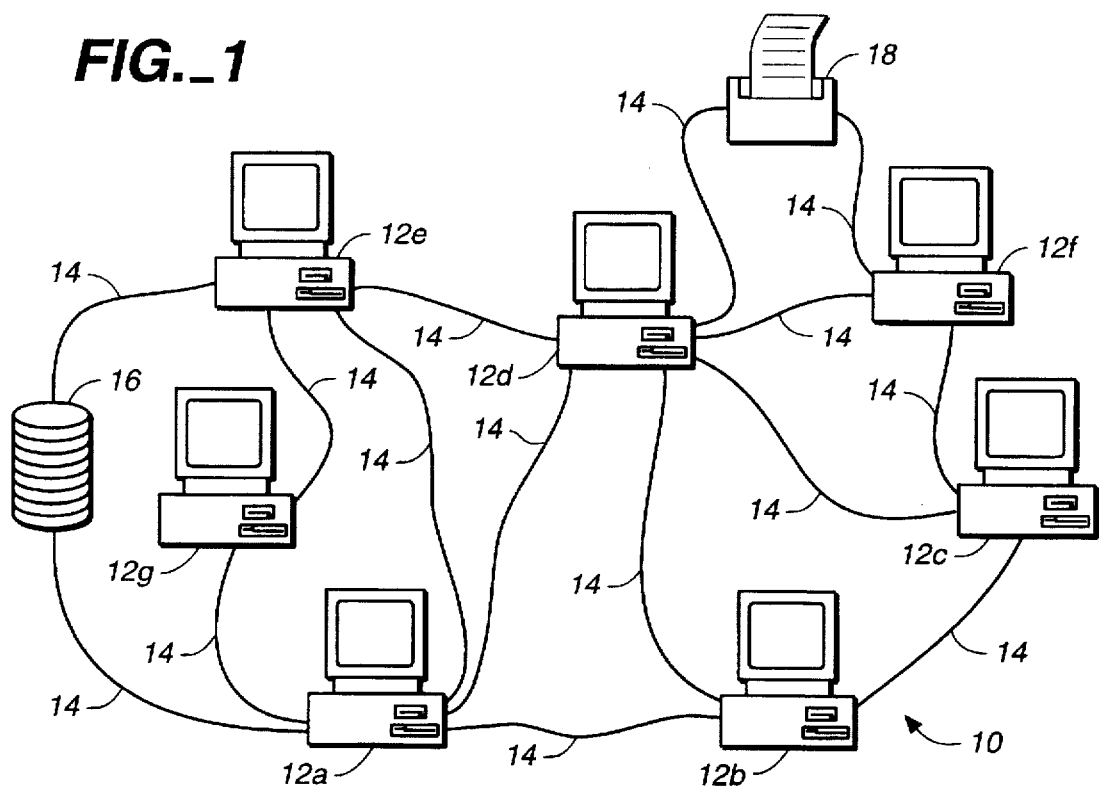
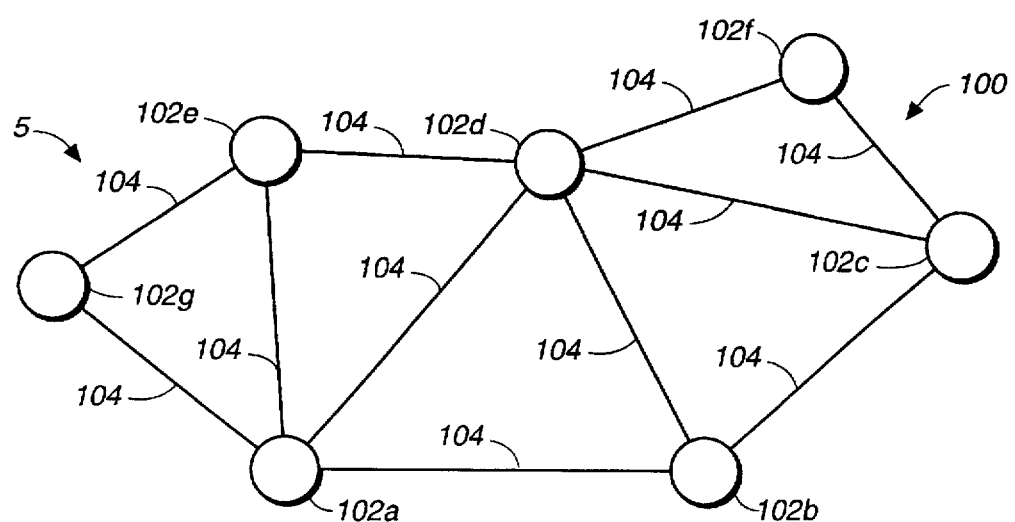
FIG._2

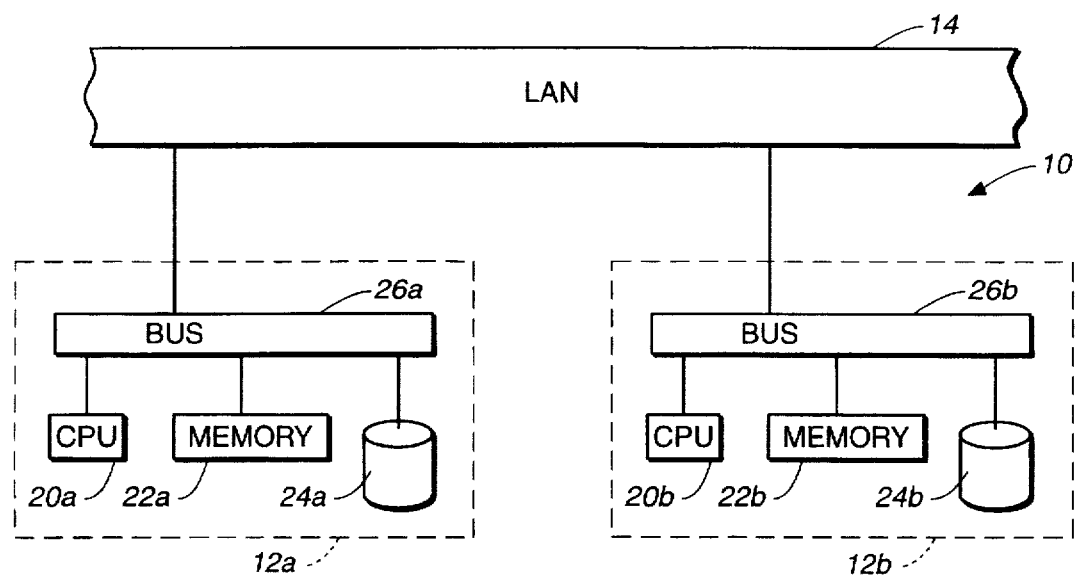
FIG._3
FIG._4

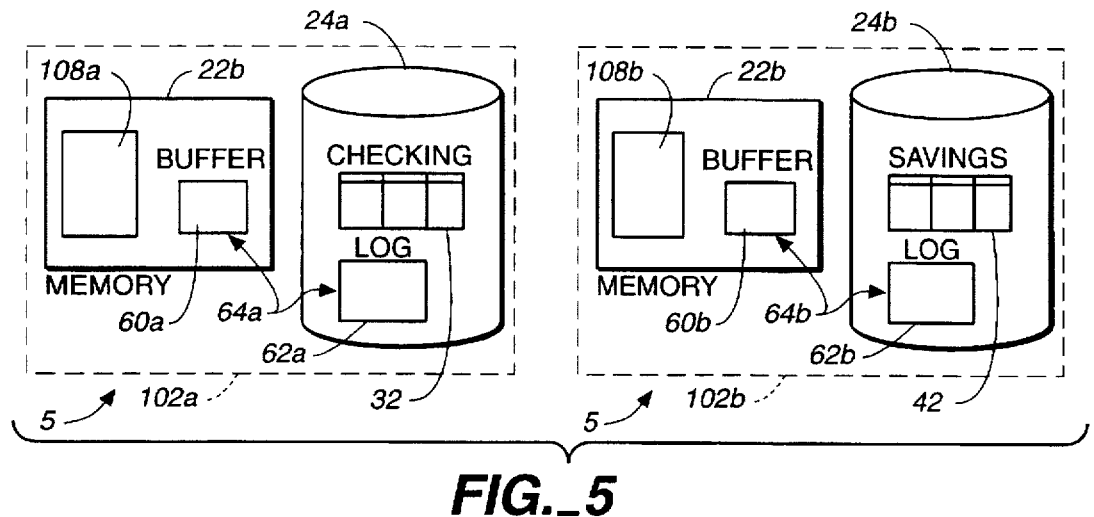
FIG._5
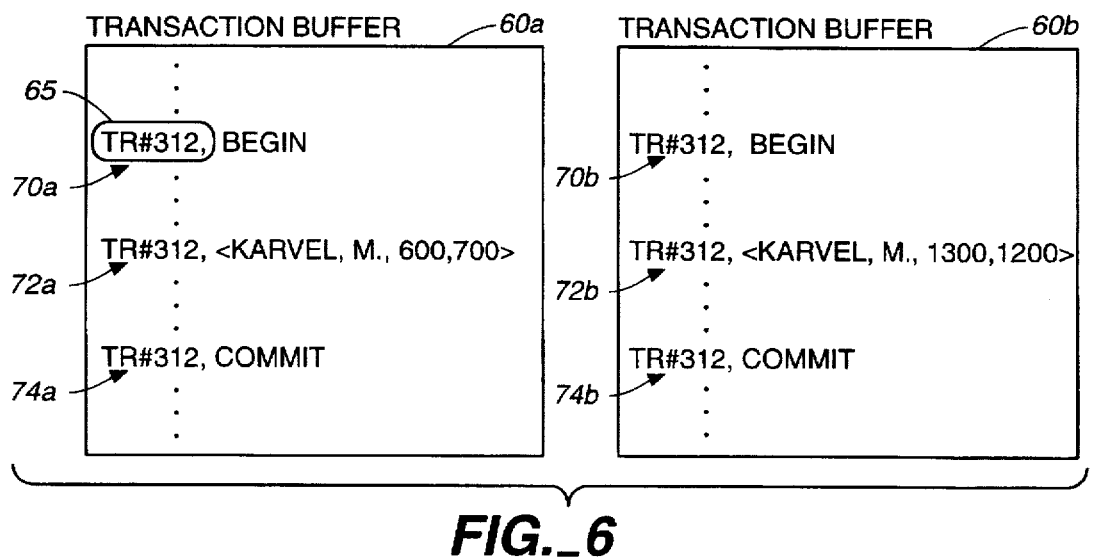
FIG._6

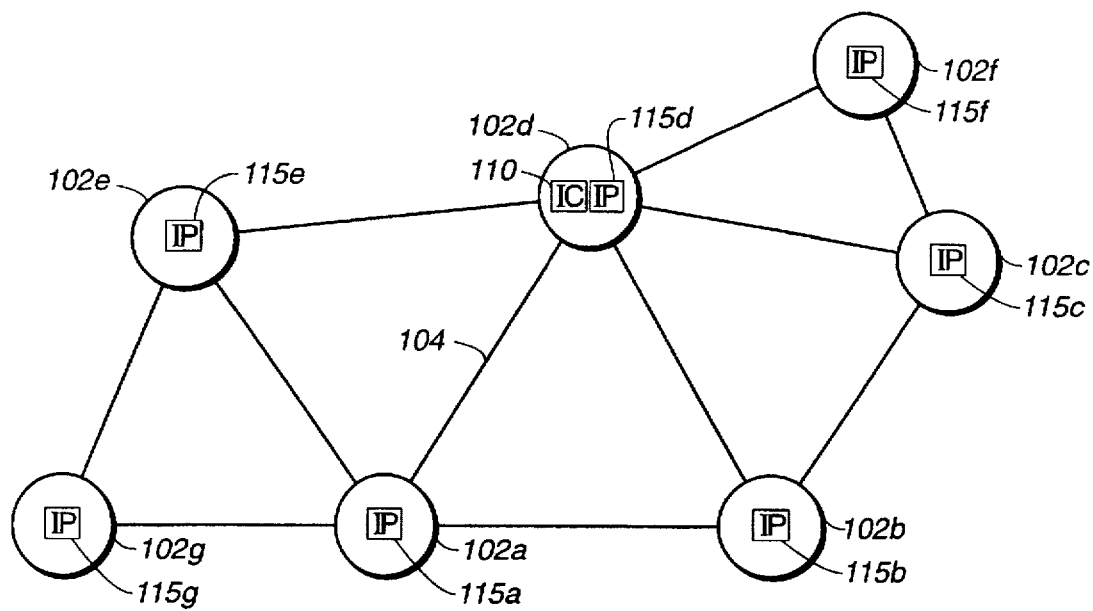
FIG._7
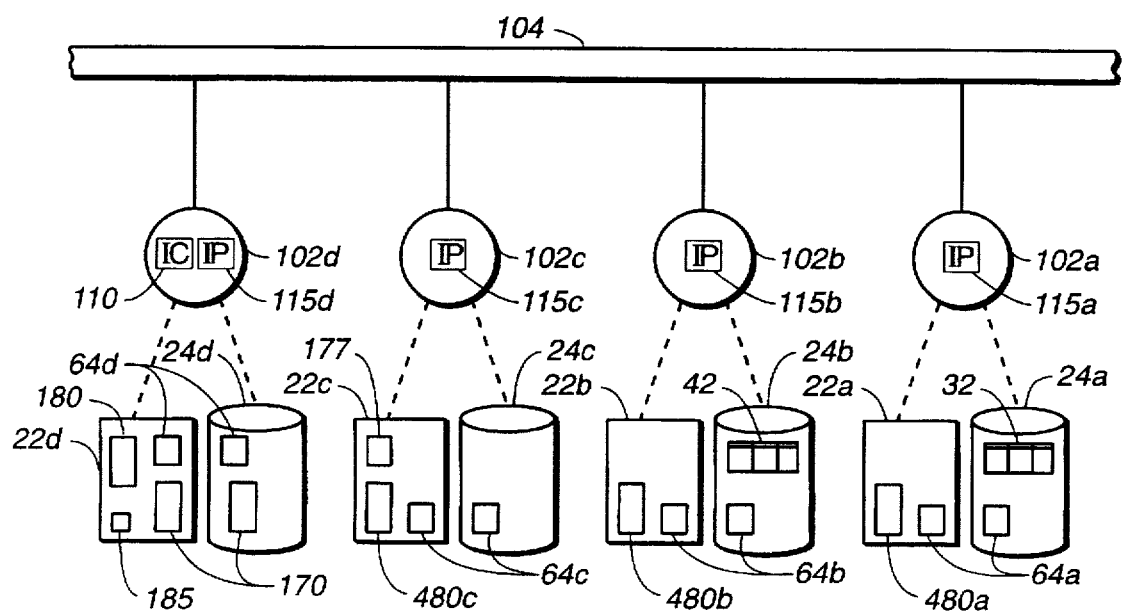
FIG._8

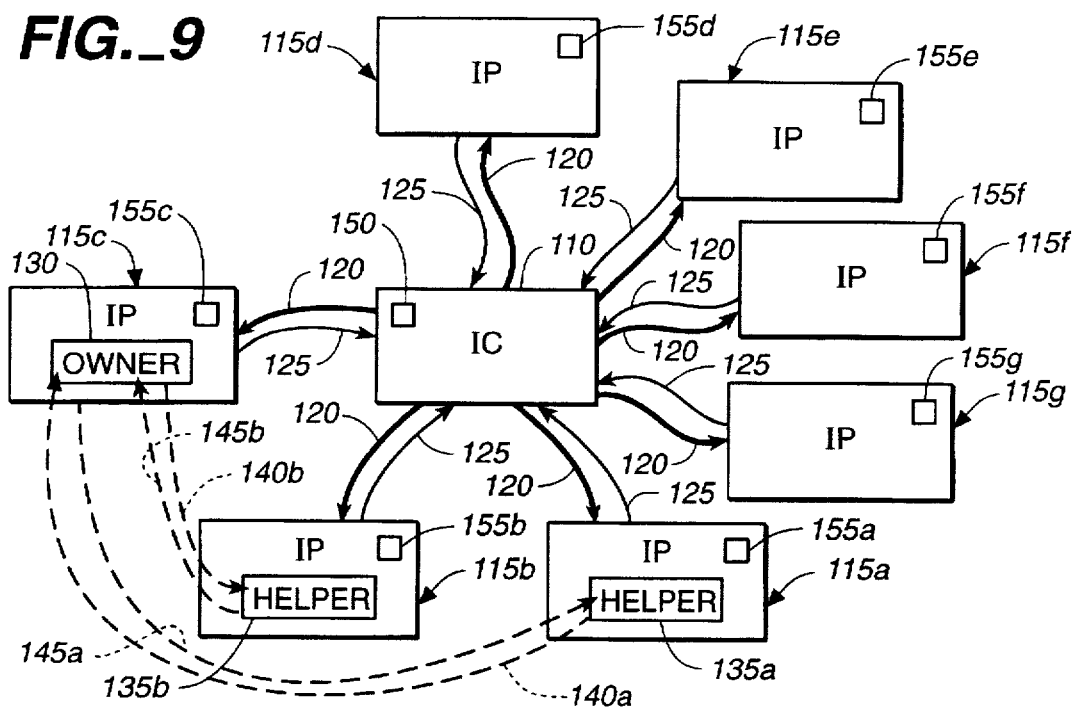
FIG._9
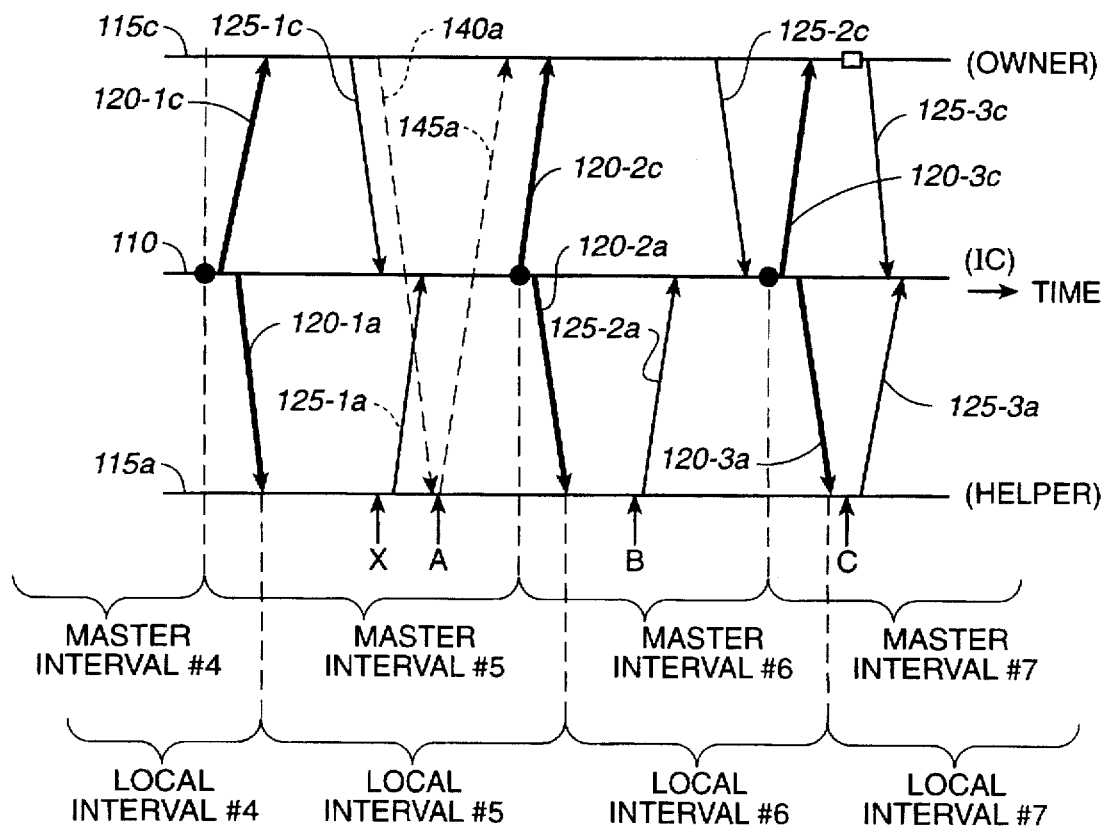
FIG._10

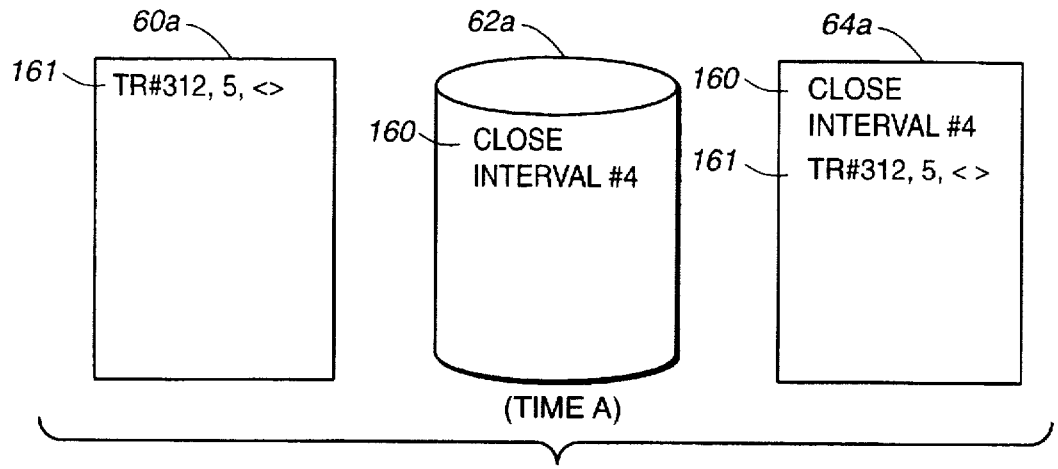
FIG._11A
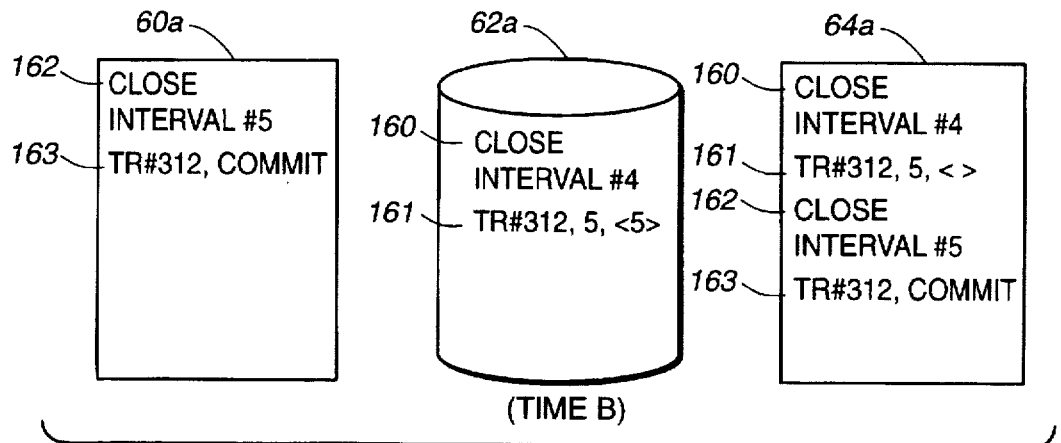
FIG._11B
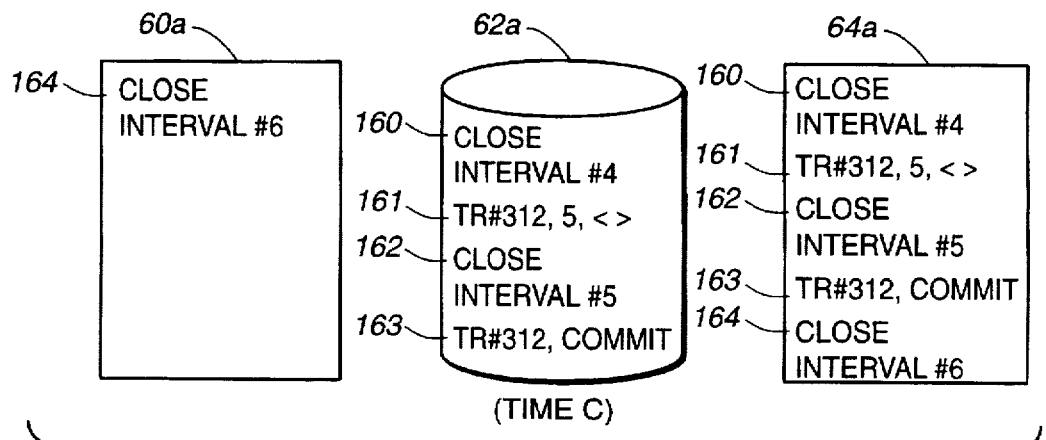
FIG._11C

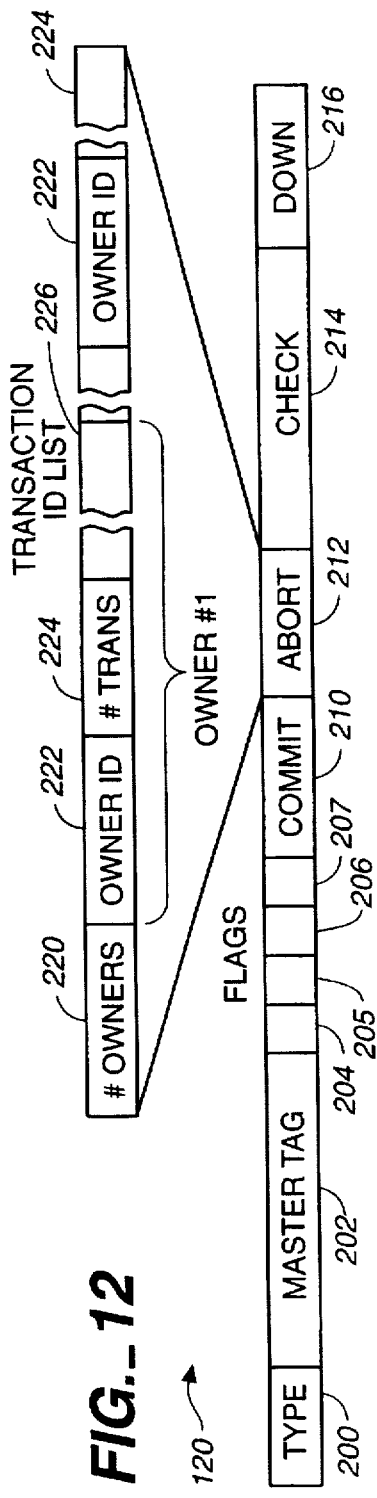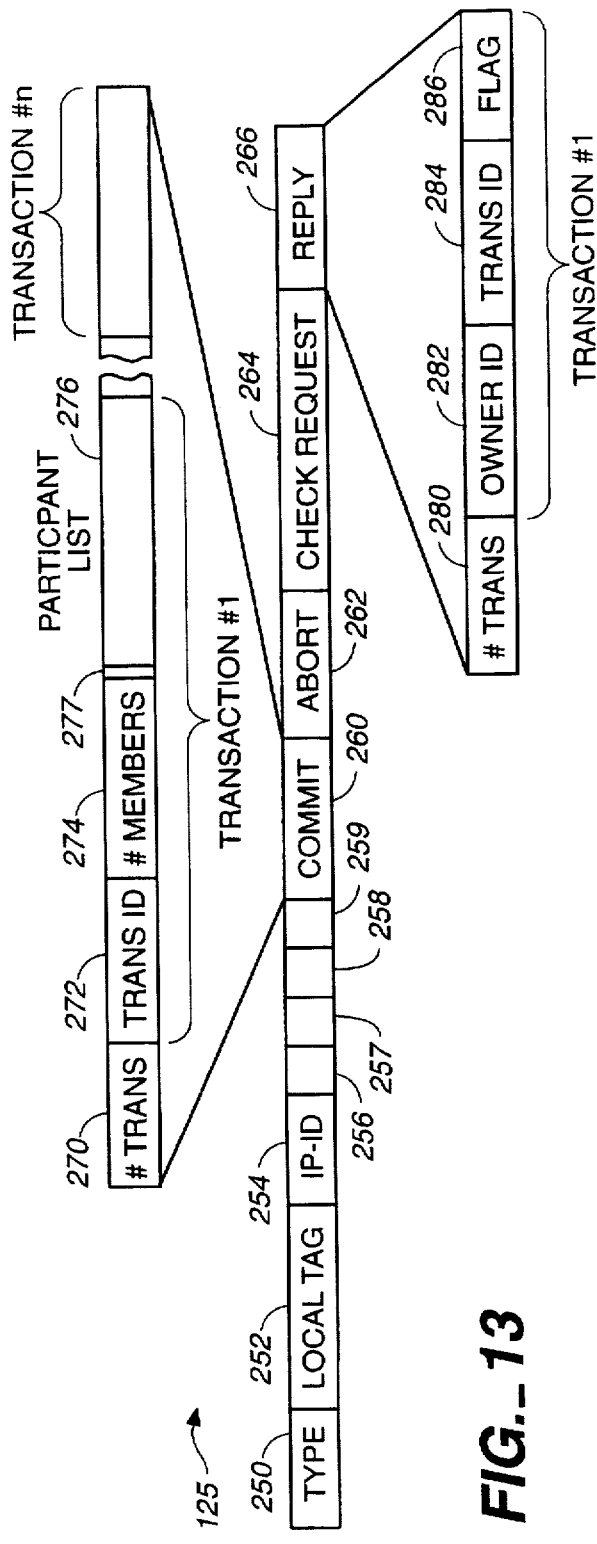

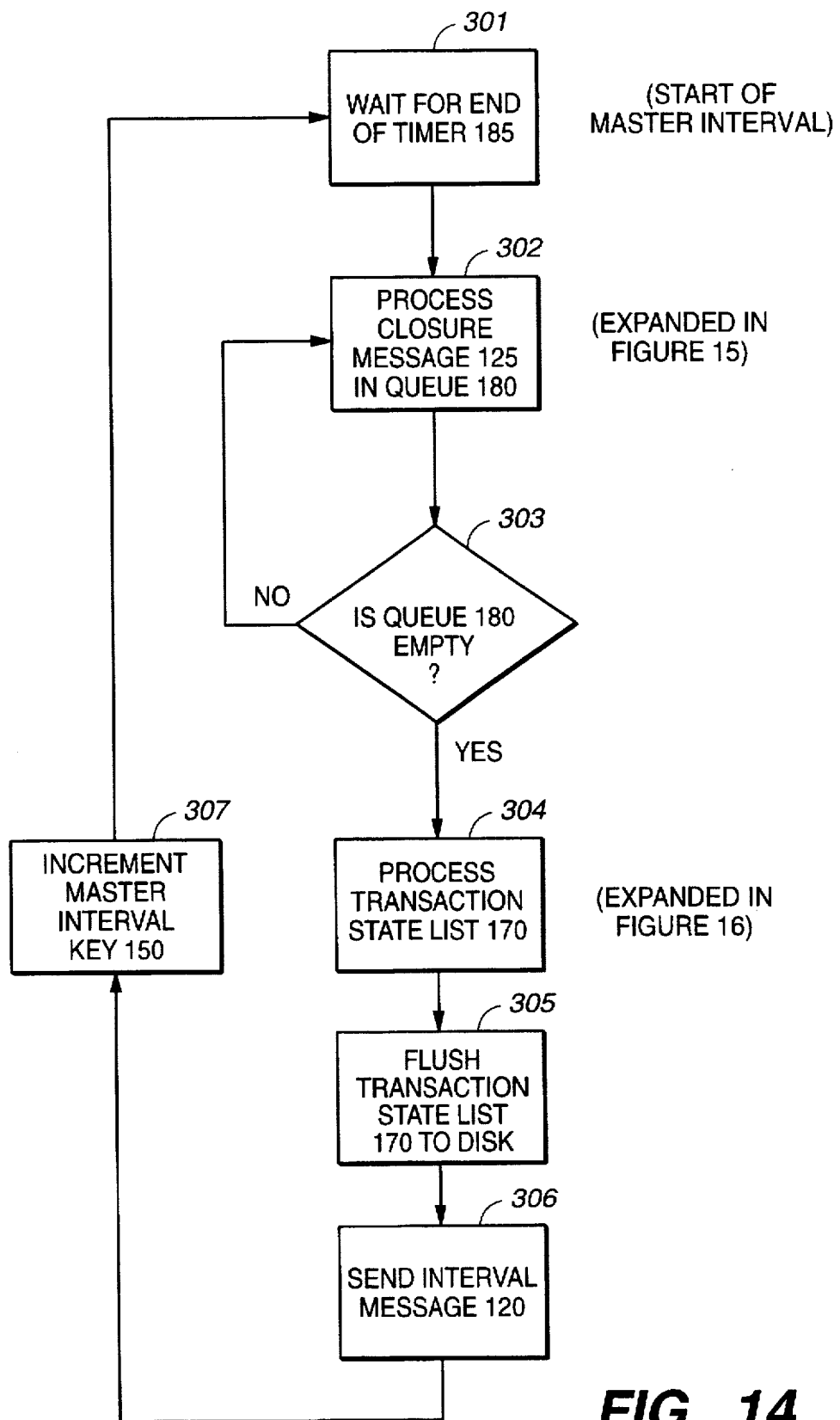
FIG._14

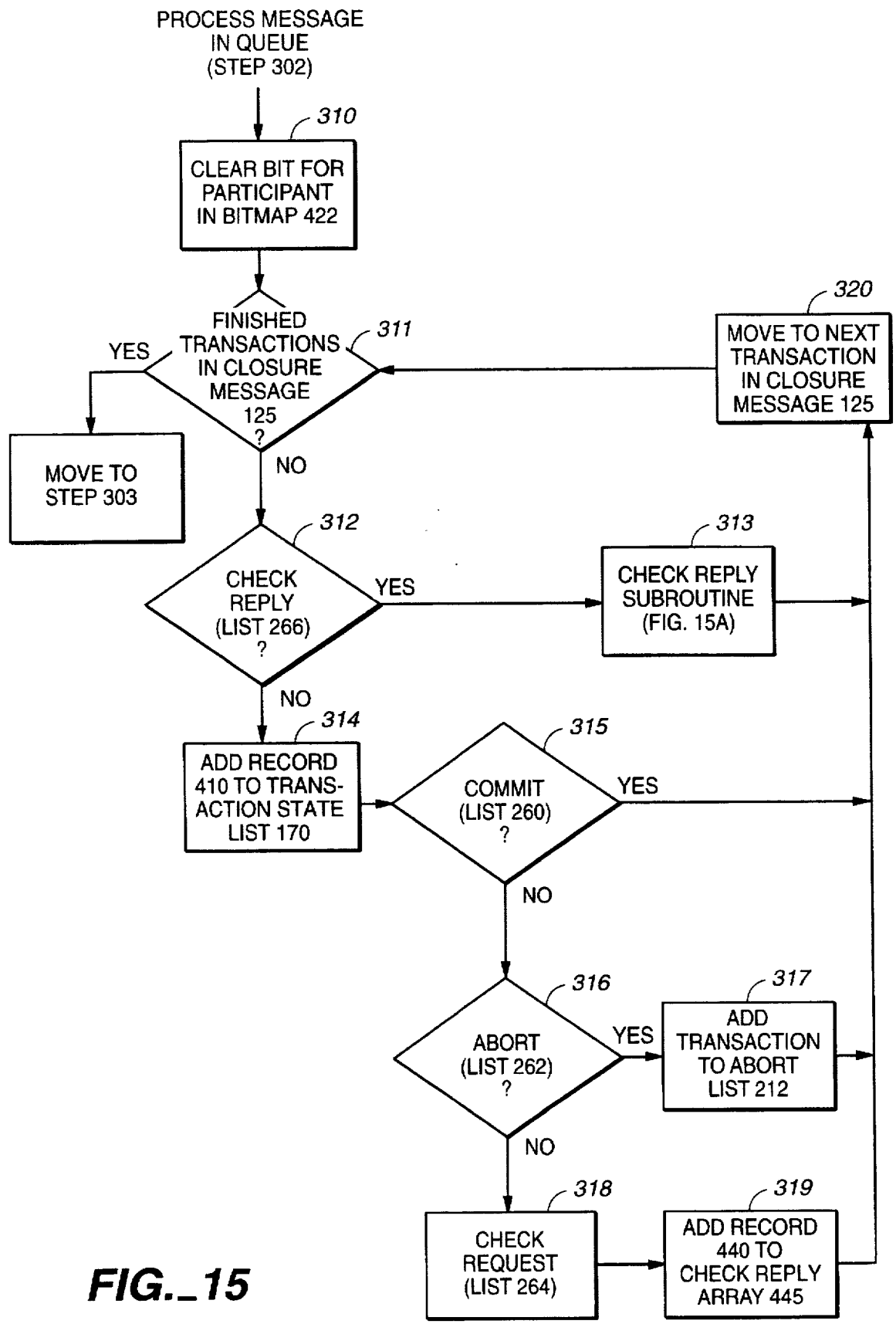
FIG._15

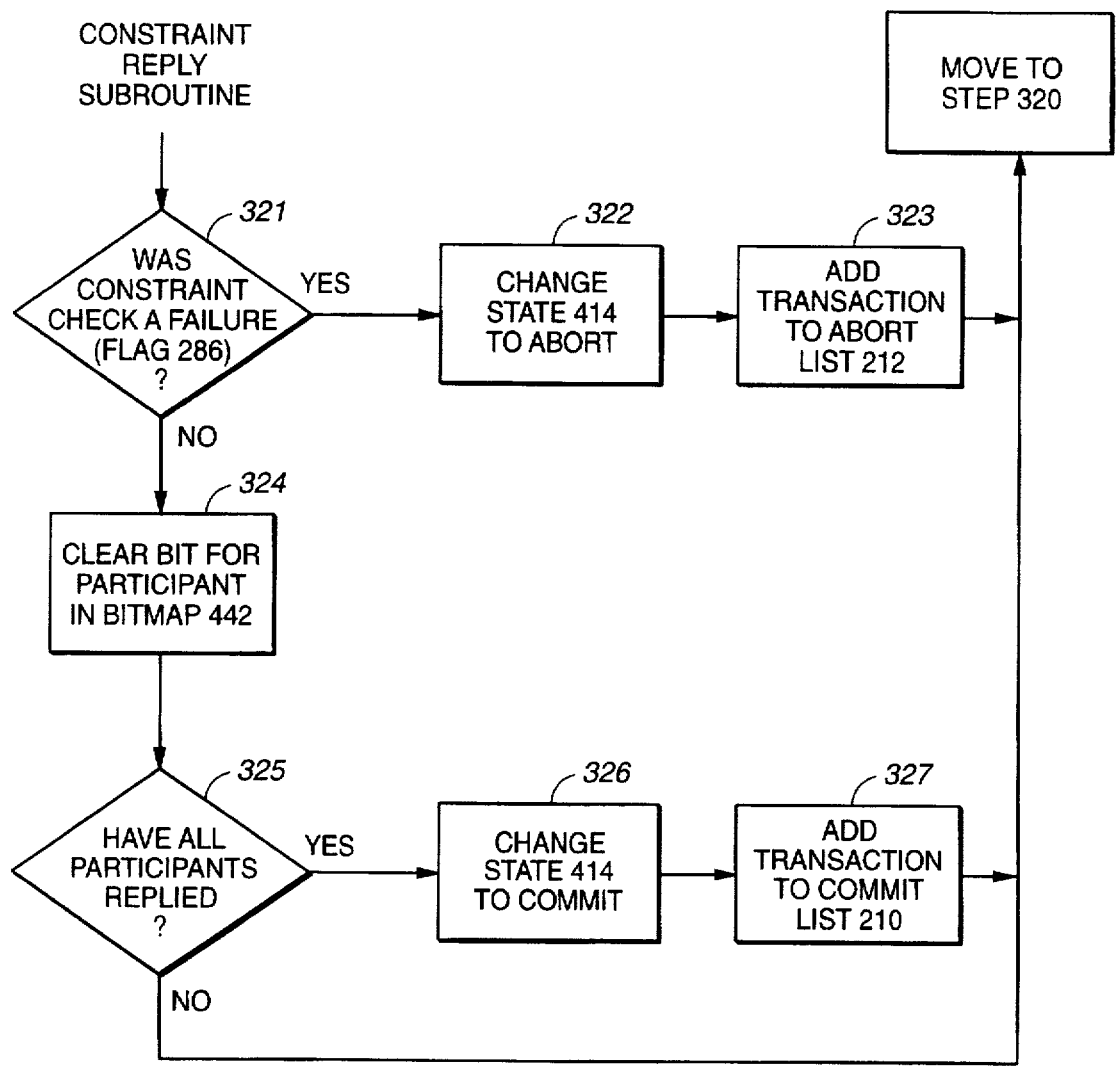
FIG._15A

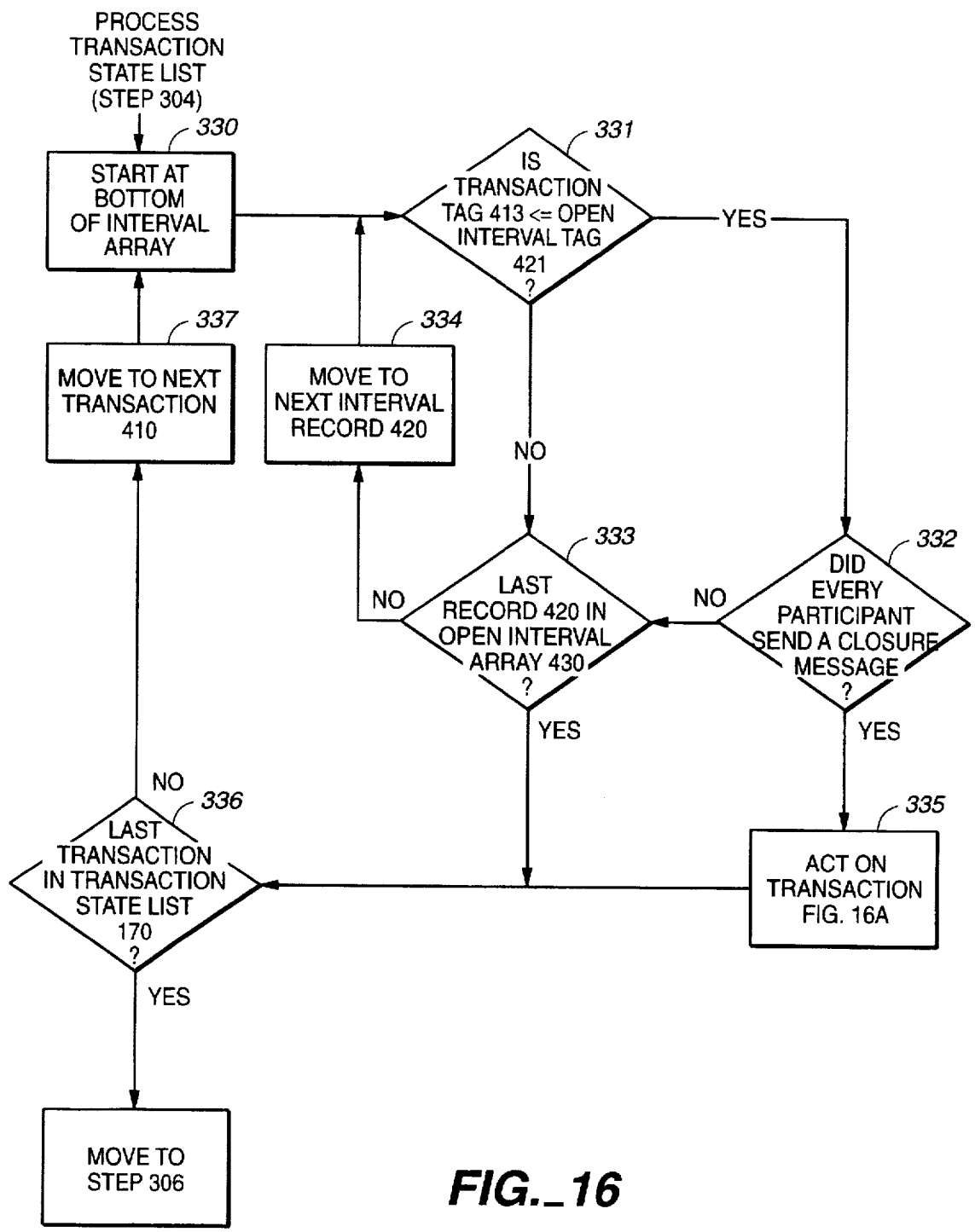
FIG._16

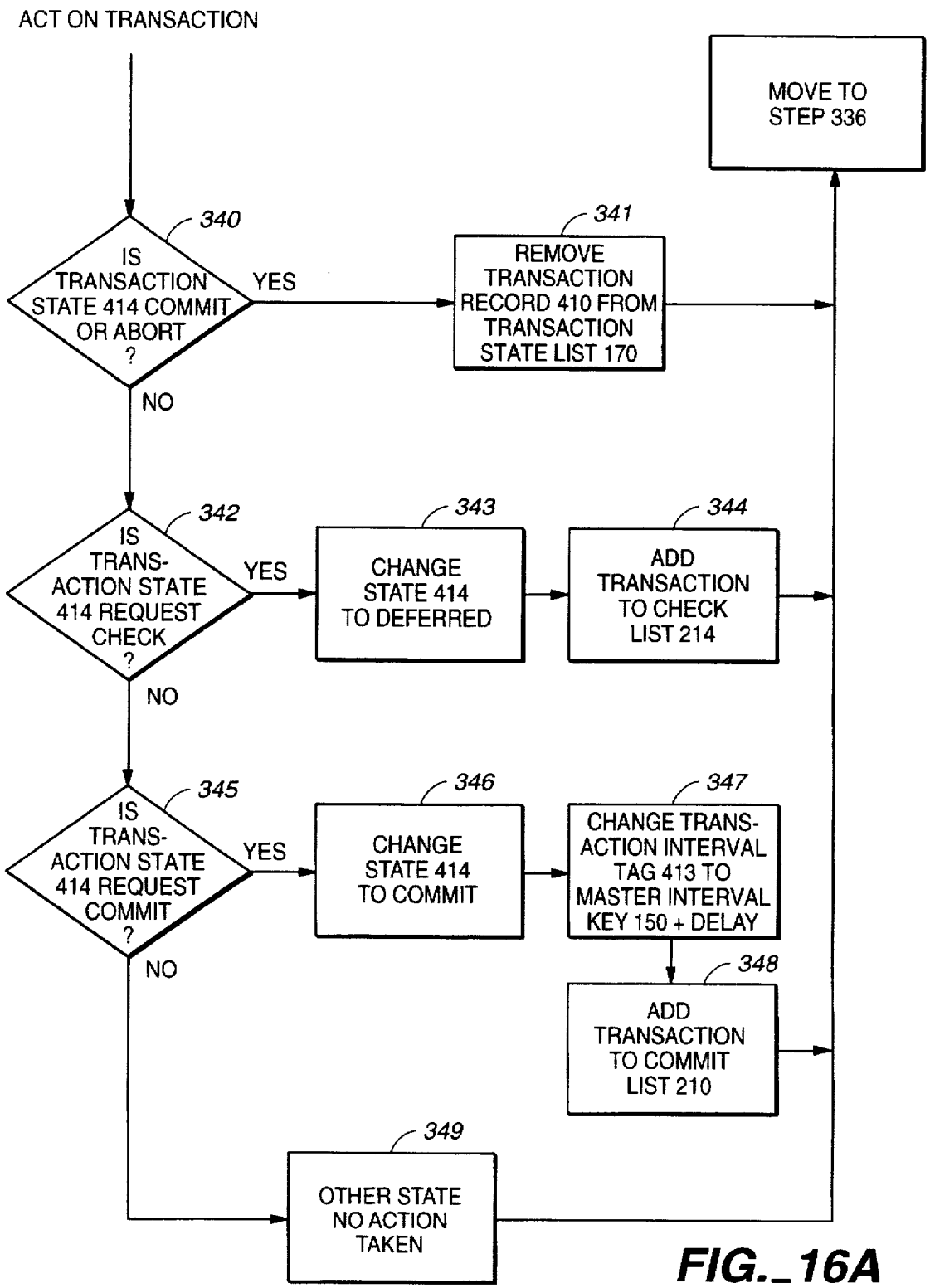
FIG._16A

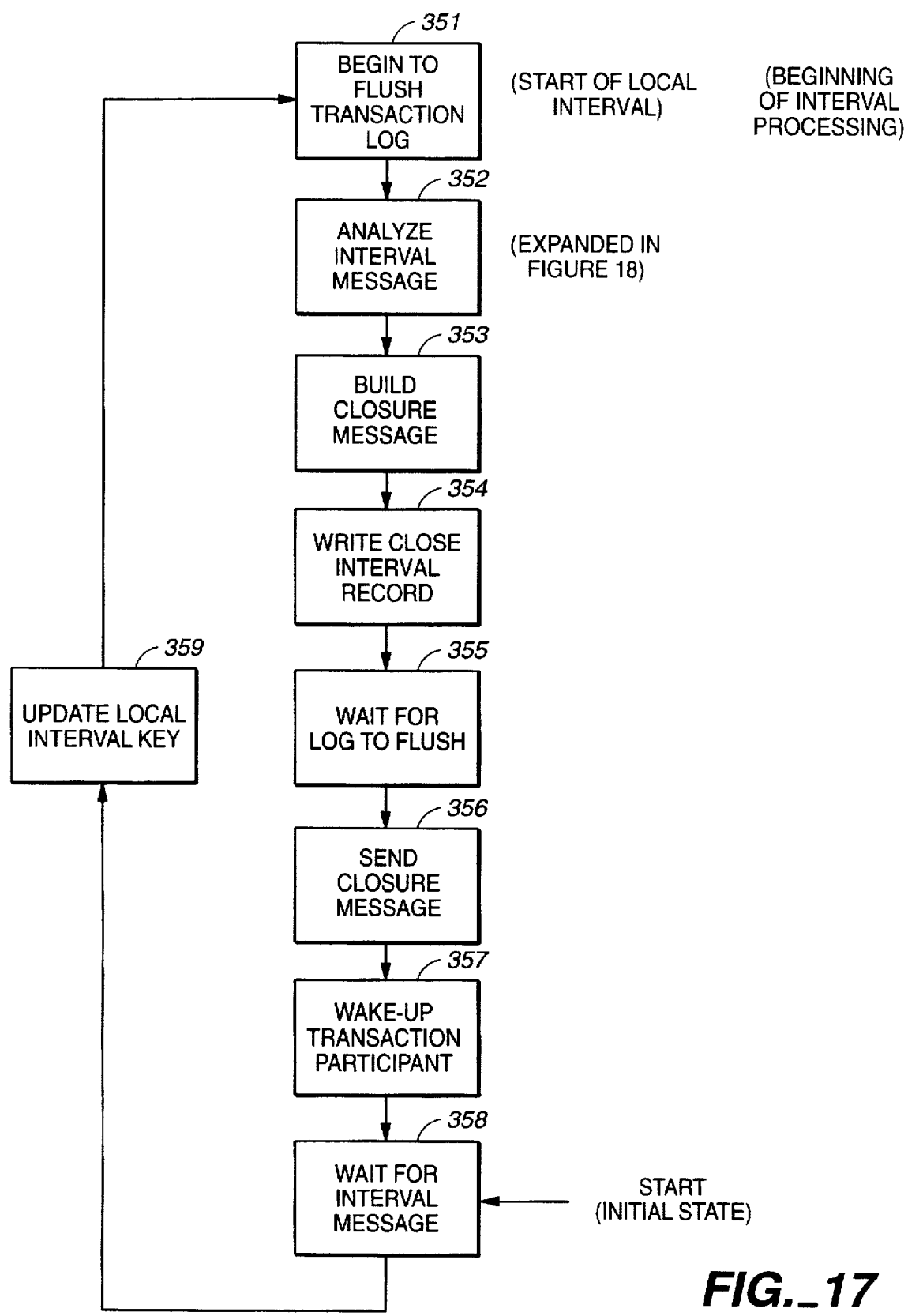
FIG._17

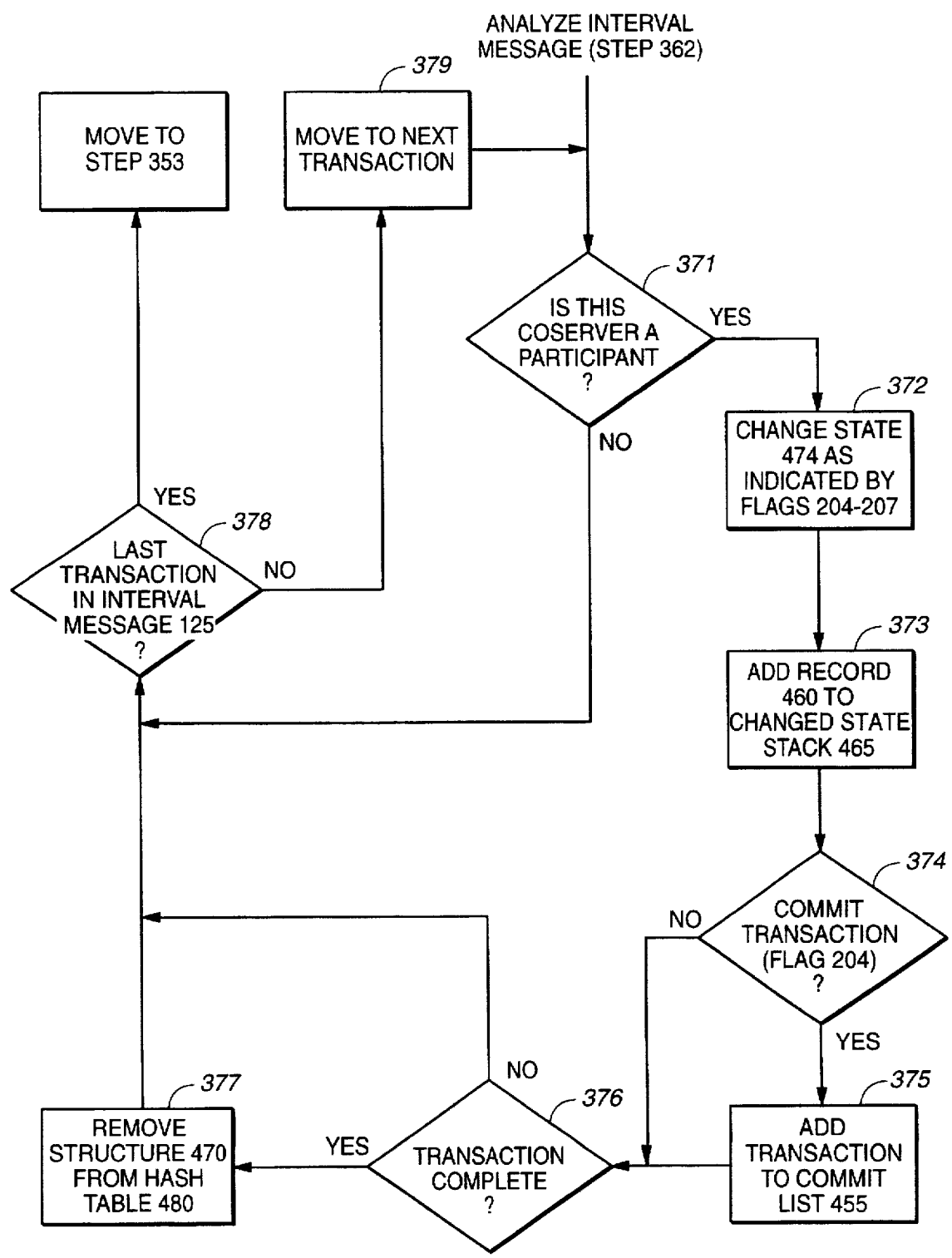
FIG._18

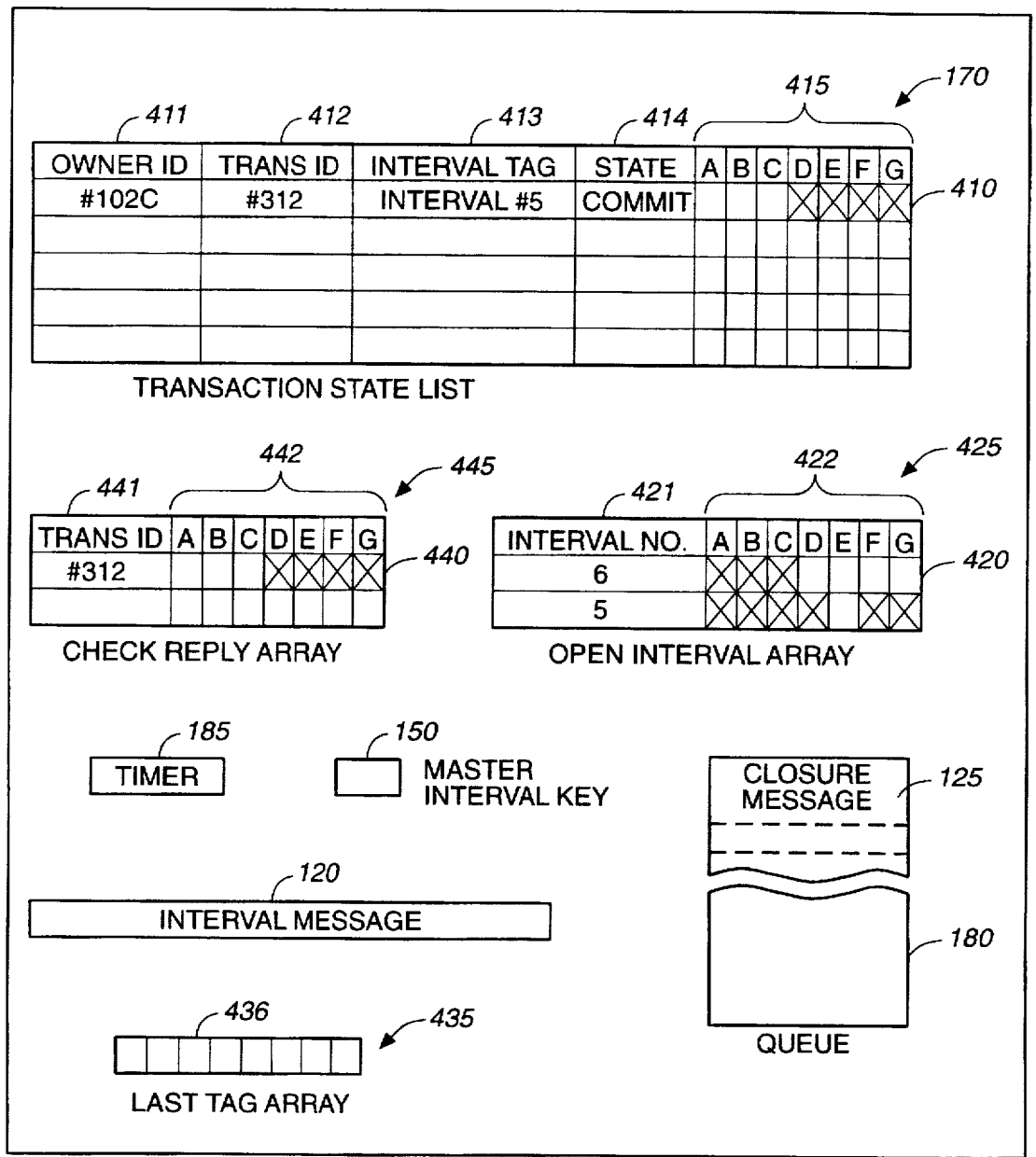
FIG._19

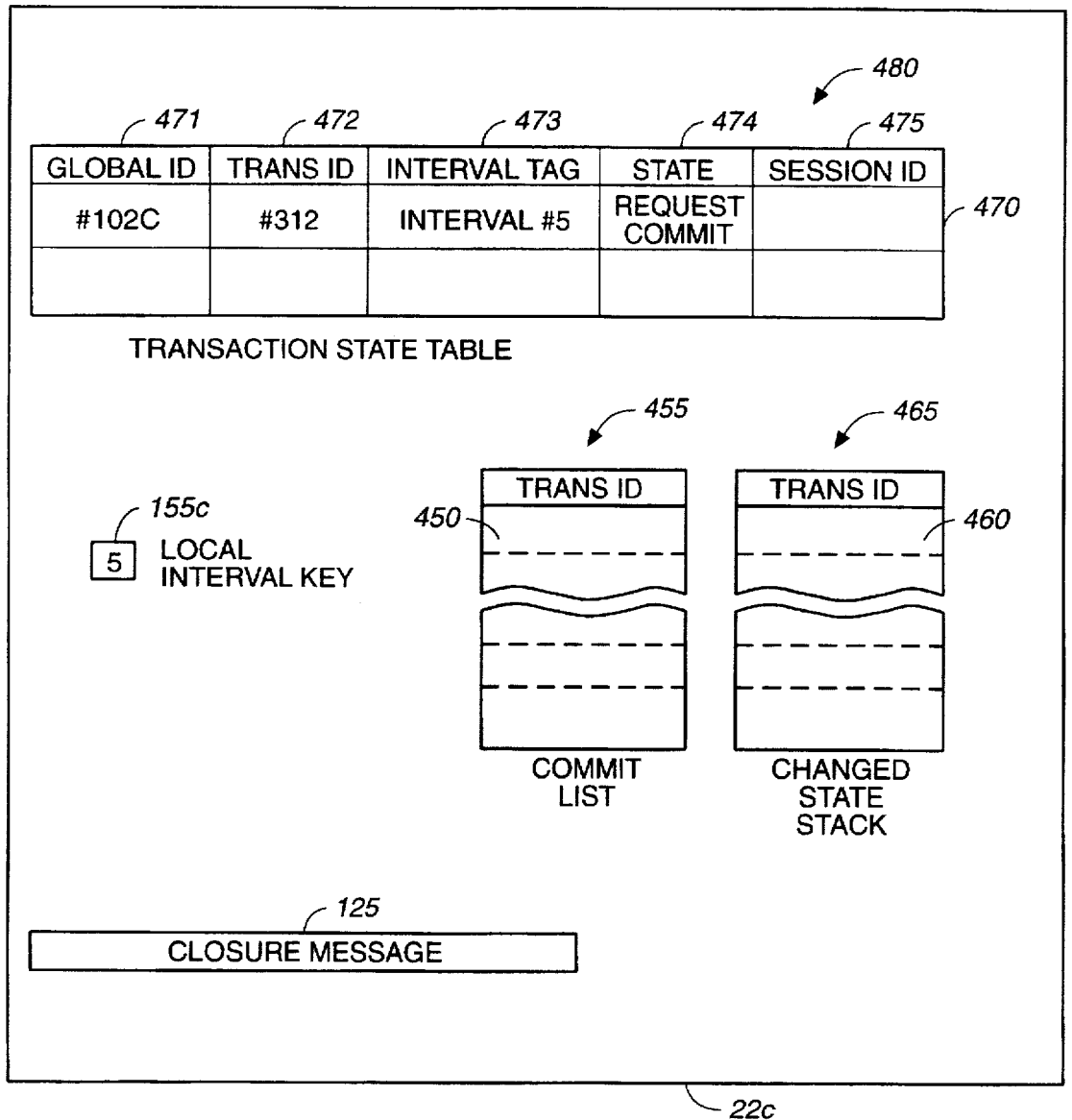
FIG._20

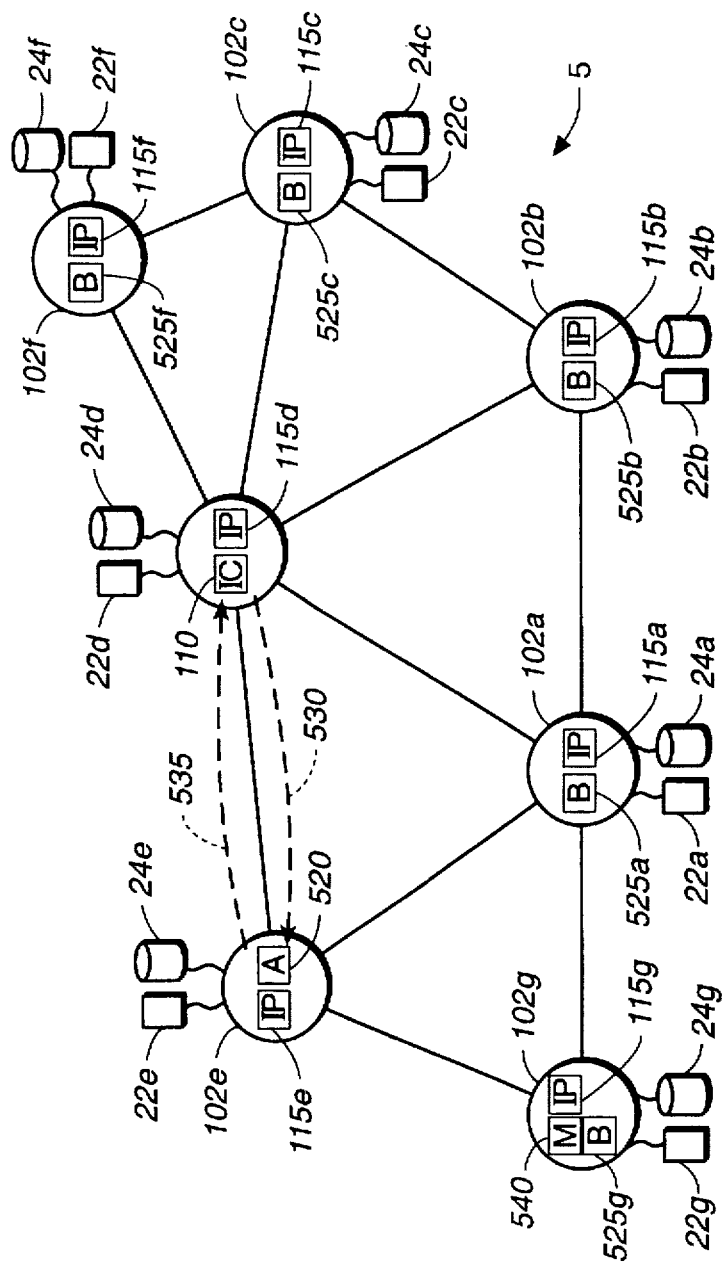
FIG._21

METHOD OF COMMITMENT IN A DISTRIBUTED DATABASE TRANSACTION

BACKGROUND OF THE INVENTION

The present invention relates generally to commitment protocols for distributed database transactions, and more particularly to commitment protocols in which a coordinator regularly exchanges messages with participants.

A fundamental design goal of any database system is "consistency", that is, the information stored in the database obeys certain constraints. For example, when transferring money from a savings account to a checking account, the total of the two accounts must remain the same. If the savings account is debited but the checking account is not credited, the customer will be dissatisfied. On the other hand, if the checking account is credited but the savings account is not debited, the bank will be dissatisfied.

An operation is a modification, for example, alteration, deletion, or insertion, of a single piece of information in a database. A transaction is a collection of operations that performs a single logical action in a database application. For example, conducting an account transfer is a transaction. Debiting the savings account is one operation in the account transfer transaction, and crediting the checking account is another operation. In order to preserve consistency, every operation of a transaction must be performed or none can be performed. This requirement is called "atomicity".

Under normal conditions, any required constraints are enforced by the database system by simply carrying out every operation in the transaction. However, software bugs, hardware crashes, and power outages can cause a database system to fail. When a failure occurs, information that is in volatile memory, for example, random access memory (RAM), may be lost and consistency violated. For example, a banking database system might debit the savings account but crash before crediting the checking account. Therefore, another design goal of a database system is the ability to recover from failures and restore the information previously stored in volatile memory.

To guarantee consistency, it is critical that a database system ensures that all or none of the operations of a transaction are executed, even in the event of a failure. Sometimes a transaction cannot be completed because the transaction would violate consistency, and sometimes a transaction cannot be completed because of a failure. Sometimes, a user might change his or her mind and decide not to complete a transaction. If a transaction cannot be successfully completed, and only some of the operations are executed, then the transaction must be "aborted". Following an aborted transaction, the database is "rolled back" or restored to its condition prior to the transaction.

On the other hand, if all the operations in a transaction can be successfully executed, even in the event of a failure, then the transaction is "committed". If a failure does occur, and only some of the operations are executed, then when the computer is restored the committed transactions are "rolled forward" or completed, and the aborted transactions are "rolled-back" or undone.

In other words, if a computer fails and is restored, those transactions which were committed are guaranteed to be in the database, and those transactions which were not committed are guaranteed not to be in the database.

One method of ensuring the all or nothing operation requirement is to impose a "commitment protocol" on the database system. In general, a commitment protocol requires the maintenance of a transaction log in non-volatile storage, for example, a hard disk. The transaction log is a list of log records containing enough information to roll back or complete the transaction. The log records contain data concerning the beginning of each transaction, the old and new values of any record modified by the transaction, and whether the transaction was committed or aborted.

An abort can occur after a change to a database has been written to non-volatile storage. In such a case, the transactions that are marked as aborted are undone by setting the modified records to the old values. For example, a banking database system might write the altered checking account balance to a hard disk, but then determine that the debit would reduce the savings account balance below zero. The database system would write an abort to the transaction log and restore the checking account balance to the old value.

A failure can occur after commitment but before a change has been written to non-volatile storage. In such a case, the transactions that were marked as committed in the transaction log are redone by setting the old records to the new values. For example, a banking database system might successfully alter the checking and savings account balances in RAM and write a commitment to the transaction log on disk, but suffer a power failure before the changes in RAM can be stored to disk. When the database system is restored, it would search the transaction log and determine that the account transfer transaction had been committed, and redo the debit and credit operations.

A distributed database is a database in which records are stored on several different computers or nodes in a computer network, or in which the request to alter a record originates in a computer or node other than the computer or node where the record is stored. For example, checking account records might be stored on a first computer, savings account records might be stored at a second computer, and the request to transfer funds from a savings account to a checking account might originate at a third computer used by a bank teller. Every computer which is involved in the transaction, for example, by executing an operation to modify locally stored information, is called a "participant." The participant at which a transaction originates is called the "owner" of the transaction.

The "computer network" may be a single computer consisting of multiple processing nodes with high-speed inter-node connections, such as a parallel computer. The "computer network" can also be a cluster of interconnected computers. For the sake of this document, all of these kinds of computer systems are considered to be computer networks, and the databases on these systems will be referred to as distributed database systems.

The human being, such as the bank teller, who is interacting with the distributed database program is called a "user." The user is represented in the database program by one or more "sessions" for each transaction. A session is a program entity that is created to do the actual work in a transaction, such as altering database records. Usually there is one session per transaction at each participant in the transaction. The session that runs on the owner is the "transaction owner." The other sessions may be referred to as "transaction helpers."

The nature of failures is somewhat different in a either the system is working and transactions are processed normally, or the system has failed and transactions cannot be processed. In a distributed system, there can be partial failures in which some computers are working while others are not. There may also be partial failures in which the computers are working, but communication links between the computers have failed.

One primary benefit of the distributed database system is improved performance. Another primary benefit is scalability, that is the ability of the database system to grow without loosing performance. Another benefit it improved reliability. Since usually only a partial failure occurs, the database system is not crippled. However, the possibility of a partial failure makes the assurance of consistency more difficult. For example, the computer with the savings account records might function normally, deducting the debit, whereas the computer with the checking account records might fail, without adding the credit.

In order to preserve consistency, the two computers in this example must communicate with each other to determine whether the transfer transaction should be committed or aborted. The structure and method of the communication between the computers to ensure that every computer involved in the transaction takes the same action (commit or abort) is called a "commitment protocol." The current standard commitment protocol for distributed database transactions is called the "two-phase commit" (2PC) protocol. The two-phase commit protocol operates generally as described below.

First, in the "prepare to commit" phase, the owner of a transaction sends a prepare to commit message to each participant and asks each participant to respond with a vote to commit or abort. Each participant determines whether it wishes to commit or abort the transaction.

If the participant wishes to commit the transaction, it records the fact that the transaction is prepared for commitment to its local transaction log in non-volatile storage. The local transaction log will have already recorded the old and new values of the local changes made by that transaction to the database. Then the participant sends a "yes" vote back to the owner.

If the participant decides to abort, it records an abort of the transaction to non-volatile storage and sends a "no" vote back to the owner. There are a number of reasons why a participant might decide to abort. An operation may violate some constraint imposed on the database. For example, if debiting the savings account would reduce the balance in the savings account below zero, then that participant would abort the transfer transaction.

Second, in the decision phase, the owner collects all the votes from the participants. If all the participants voted yes, then the owner records a commit of the transaction to its transaction log in non-volatile storage. At this point the transaction is committed. Then the owner sends a message to each participant to commit the transaction.

If any participant voted no, then the owner records an abort of the transaction to non-volatile storage, and sends a message to each participant to abort the transaction. Each participant that placed a prepared to commit record in non-volatile storage will wait for a commit or abort message from the owner to take action.

Unfortunately, two phase commit is a message intensive protocol. In particular, the exchange of a set of messages for each individual transaction, and the extra preparation of commit messages, create a large amount of network traffic. In the two-phase commit the number of messages sent over the computer network is proportional to the number of transactions and the number of participants in each transaction. For systems with a large number of small transactions, two phase commit can assert a heavy load on the network.

In view of the foregoing, an object of the present invention is to provide a distributed database commitment protocol which minimizes network usage.

Another object of the invention is to provide a distributed database commitment protocol which is superior to two-phase commit under most operating conditions.

Additional objects and advantages of the invention will be set forth in the description which follows, and in part will be obvious from the description, or may be learned by practice of the invention. The objects and advantages of the invention may be realized by means of the instrumentalities and combinations particularly pointed out in the claims.

SUMMARY OF THE INVENTION

The present invention is directed to a method for committing a distributed transaction in a distributed database system. The database system includes an interval coordinator, a plurality of coservers, and at least one transaction log. The interval coordinator sends each coserver a succession of interval messages, and each coserver flushes its associated transaction log to non-volatile storage in response. After flushing its transaction log, each coserver transmits a closure message to the interval coordinator. The coservers maintain a state which identifies the most recently received interval message. Each distributed transaction includes an owner and a helper with associated coservers. For a transaction, the owner transmits a request message to the helper identifying an operation in the distributed transaction for the associated coserver to execute. Upon execution of the operation, the coserver transmits a completion message to the owner with a tag identifying the most recently received interval message. After receiving said completion message, the owner transmits an eligibility message for the transaction to the interval coordinator. Then the interval coordinator writes a commit state for the transaction to stable storage. After the commit state is written to stable storage, the interval coordinator sends the owner and helper a commit message for the transaction.

BRIEF DESCRIPTION OF THE DRAWING

The accompanying drawings, which are incorporated in and constitute a part of the specification, schematically illustrate a preferred embodiment of the invention, and together with the general description given above and the detailed description of the preferred embodiment given below, serve to explain the principles of the invention.

FIG. 1 is a schematic illustration of a computer network.

FIG. 2 is a schematic illustration of a coserver network.

FIG. 3 is a schematic block diagram of two computers connected to a network.

FIG. 4 is an example of a computer database.

FIG. 5 is a schematic block diagram of a distributed database.

FIG. 6 is an example of two transaction logs used by a distributed database.

FIG. 7 is a schematic illustration of a coserver network running an interval coordinator and multiple interval participants according to the present invention.

FIG. 8 is a schematic illustration of a distributed database system according to the present invention.

FIG. 9 is a schematic block diagram illustrating the exchange of messages between interval participants and the interval coordinator according to the present invention.

FIG. 10 is a schematic time-line showing the exchange of messages between an owner, a helper, and an interval coordinator.

FIGS. 11A, 11B, and 11C are examples of log marver log maintained by the distributed database of the present invention at times A, B, and C in FIG. 10.

FIG. 12 is a schematic diagram of an interval message.

FIG. 13 is a schematic diagram of a closure message.

FIG. 14 is a flowchart of the process of an interval coordinator.

FIGS. 15 and 15A are a flowchart of the method of processing a message in the queue.

FIGS. 16 and 16A are a flowchart of the method of processing the transaction state list.

FIG. 17 is a flowchart of the process of an interval participant.

FIG. 18 is a flowchart of the method of analyzing an interval message.

FIG. 19 is a schematic block diagram of the data structures used by an interval coordinator.

FIG. 20 is a schematic block diagram of the data structures used by an interval participant.

FIG. 21 is a schematic block diagram of a distributed database system using backup internal coordinators.

DESCRIPTION OF THE PREFERRED EMBODIMENTS

As shown in FIG. 1, a distributed database operates on a computer network 10. Computer network 10 includes multiple computers 12a–12g, such as workstations, connected by network lines 14. Naturally, network 10 could have less than or more than seven computers. Network 10 may also include other devices, such as a server 16 and a printer 18. Although shown as multiply-interconnected, computer network 10 could utilize a ring, star, tree, or any other interconnection topology. Computer network 10 could be a local area network (LAN), a wide area network (WAN), a cluster interconnect, or a single computer with multiple processing nodes which communicate over an interconnect switch. For a high performance database system, network 10 is preferably a multi-node parallel processing computer or cluster. However, for clarity, database system 5 will be explained with reference to a LAN network.

Computer network 10 will inevitably be subject to failures. Some failures are associated with the communication links between nodes, that is computers 12a–12g. For example, network lines 14 can be severed, or the volume of messages on network lines 14 could exceed the capacity of the network. Other failures may be associated with the computers 12a–12g. For example, a power outage may shut off one or more computers, or a component of a particular computer may malfunction.

As shown in FIG. 2, a distributed database system 5 comprises a distributed database program 100. Database program 100 includes coservers 102a–102g connected by communication links 104. Each coserver 102a–102g is a collection of database programs working together on a single node. Each coserver can provide storage, archival, data manipulation, and communications capabilities via links 104. Typically, only one coserver runs on any one computer node, but it is possible for multiple coservers to run on a single computer node. In addition, some computers in the network may not support a coserver.

Database network 100 can also be subject to failures. For example, a software bug could cause a particular coserver, such as coserver 102d, to crash. Naturally, a partial or complete failure in computer 12a that supports coserver 102a leads to a failure in database program 100.

As shown in FIG. 3, computer system 10 can be represented as a set of computers connected to a network 14, such as a LAN. Network 14 will have a limited bandwidth capacity; that is, network 14 can only carry a limited amount of information at any one time. For example, if the network is an Ethernet, then it can typically handle ten megabits per second.

Each computer, such as computer 12a, includes at least one central processing unit (CPU) 20a, a memory 22a, and storage 24a. Memory 22a is a volatile storage such as random access memory (RAM); its contents are lost in the event of a power failure. Storage 24a is a non-volatile storage such as one or more hard disks. In cluster configurations, the computers may share access to non-volatile storage devices. CPU 20a, memory 22a, and storage 24a are interconnected by a bus 26a. Network 14 is typically also connected to computer 12a through bus 26a.

As shown in FIG. 4, a database 30 is a collection of related information. A database typically stores information in tables with columns of similar information called "fields" and rows of related information called "records." For example, a bank might use database 30 to monitor checking and savings accounts. A checking accounts table 32 could have fields to store the customer names 34, checking accounts numbers 36, and current checking accounts balances 38. A savings accounts table 42 could similarly have fields to store the customer names 44, savings accounts numbers 46, and current savings accounts balances 48. Data record 50, for example, indicates that customer G. Brown has a balance of $2500.00 in checking account number 745–906. The information of a particular data record in a particular field is referred to as an "entry". For example, entry 55 is a balance of $600.00 for M. Karvel's checking account.

As shown in FIG. 5, a distributed database system 5 stores information from database 30 on coservers 102a and 102b. Associated with coserver 102a and 102b are memory blocks 22a and 22b and non-volatile storage 24a and 24b of computers 12a and 12b, respectively. Checking accounts table 32 may be stored on hard disk 24a and saving accounts table 42 may be stored on hard disk 24b. Coserver 102a may execute operations on the information in checking accounts table 32, and coserver 102b may execute operations on the information in saving accounts table 42.

Each coserver has access to a transaction log. Preferably there is one transaction log for each coserver. For example, transaction log 64a for coserver 102a is stored partially in a buffer 60a of memory 22a and partially on disk space 62a of hard disk 24a. When the list of transactions in the buffer is written to the non-volatile disk, the transaction log is said to have been "flushed to disk".

It is possible for the transaction logs of coservers to be multiplexed together as one or more transaction logs on the same storage device. Regardless of how coservers 102a–102g share storage devices or logs, the semantics and actions associated with writing and flushing the transaction log remain the same. Therefore, transaction logging and commit processing at each particular coserver will be unaffected.

Because more than one coserver can operate at a single computer or node, the definition of a participant for database system 5 must be clarified. As used herein, every coserver which is involved in the transaction is a "participant", and the participant at which the transaction originated is the "owner" of the transaction. Those coservers which are participants in the transaction but which are not the owner are "helpers." For example, in the account transfer transaction described below, coservers 102a–102b are helpers in the transaction, and coserver 102c is the owner of the transaction.

As described with reference to FIGS. 5 and 6, database system 5 may execute a distributed transaction on database 30, such as a transfer of $100 from M. Karvel's savings to checking account. If, for example, a bank teller enters a request for a transaction at coserver 102c, then coserver 102c becomes the owner of the account transfer transaction. Coserver 102c determines that coservers 102a and 102b control the checking accounts table 32 and savings accounts table 42, respectively. Coserver 102c sends a message to coserver 102a with the operation to credit the checking account $100, and another message to coserver 102b with the operation to debit the savings account $100. The message includes a transaction code to identify the transaction and an owner code to identify the owner.

When the message reaches coserver 102a, it may write a log record 70a in buffer 60a indicating the start of the account transfer transaction. If the data record 52 of this customer's checking account (see FIG. 4) is not already present in memory 22a, then data record 52 is read from disk 24a into memory 22a. Then, the credit operation is performed on balance field 38 of data record 52 so that balance entry 55 is increased by $100. Another log record 72a is added to transaction buffer 60a recording the old value, $600, and the new value, $700, of entry 55. Eventually, according to the commit protocol of the present invention which will be described in detail below, a log record 74a is made in transaction buffer 60a as to whether the account transfer transaction was committed or aborted. It may be noted that, unlike the two-phase commit protocol, in the present invention no log record is made in buffer 60a that the account transfer transaction is prepared or eligible to commit.

The process carried out by coserver 102b for the debit operation is very similar, except that savings account record 53 (see FIG. 4) is read into memory 24b, and a debit operation is performed on balance entry 56. Log record 72b records the old value, $1300, and the new value $1200, of balance entry 56. Log record 70b indicates the beginning of the transfer transaction and log record 74b indicates whether the transfer transaction was committed or aborted.

Table 32 on disk 24a may be updated with the new value for balance entry 55 any time after log record 72a with the old and new values of balance entry 55 is flushed to disk. Similarly, table 42 on disk 24b may be updated with new value for balance entry 56 any time after log record 72b is flushed to disk.

As will be explained below, the database system of the present invention commits distributed transactions without necessarily direct message exchanges between the owner and non-owner participants in the transaction, and also ensures that every log buffer associated with a transaction has been flushed to disk before committing the transaction. This is accomplished by a regular exchange of messages between an "interval coordinator" (IC) and two or more "interval participants" (IPs). The interval coordinator is a program which determines when a transaction is committed or aborted. The interval participant is a program which ensures that the log records concerning a transaction's updates have been flushed to disk. These interval coordinator and interval participants may be parts of, subroutines of, or separate programs callable by the coservers.

When only a single coserver is involved in a transaction, a "one phase commit" protocol is used which does not require interaction with the interval coordinator. As the present invention applies to distributed transactions (generally referred to hereafter simply as "transactions"), and the one-phase commit protocol is well understood in the art, it will not be further discussed.

Database system 5 uses a "commit interval" (or simply "interval") to determine whether a transaction can be committed. The commit interval is a unit of time used to organize the exchange of messages between the interval coordinator and interval participants. An interval "closes" when every interval participant has sent a message to the interval coordinator indicating that the interval participant has flushed its transaction log to disk. An interval is said to be "open" if not every interval participant has sent such a message.

It is not necessary for an interval to have closed before a transaction is committed by the interval coordinator. Specifically, a transaction can be committed by the interval coordinator once the coserver associated with every transaction participant has sent a message to the interval coordinator indicating that it has flushed all log records for the current and previous intervals to non-volatile storage. Because a transaction may have operations on only a few pieces of data, the participants in a transaction may constitute only a small subset of all the interval participants.

As discussed, a database program 100 has multiple coservers 102a–102g connected by network links 104. As shown in FIG. 7, database system 5 includes a single interval coordinator (IC) 110 running on one coserver, for example, coserver 102d. IC 110 is used to determine the instant at which any distributed transaction is committed or aborted. Specifically, in database system 5, a transaction is committed once IC 110 flushes to disk a record marking the transaction as committed.

Database system 5 also includes IPs 115a–115g running on coservers 102a–102g, respectively. One IP runs on each coserver. Each IP 115a–115g communicates with IC 110 by exchanging certain messages, as will be explained in detail below.

As shown in FIG. 8, distributed database 30 may have information that is associated with different IPs 115a and 115b, running on different coservers 102a and 102b. For example, checking accounts table 32 may be stored on disk 24a associated with IP 115a and savings accounts table 42 may be stored on disk 24b associated with IP 115b. By way of example, IC 110 is shown as running on a separate coserver 102d, but IC 110 could run on any coserver 102a–102g.

As discussed below and as shown in FIG. 9, database system 5 generates a regular exchange of messages between IC 110 and IPs 115a–115g. By way of example, database system 5 includes seven coservers 102a–102g, but there can be a different number of coservers, as needed for a particular application. At the beginning of each interval, IC 110 transmits an "interval message" 120 to every IP 115a–115g. Interval message 120 informs IPs 115a–115g that a new interval has commenced. In a preferred embodiment, IC 110 transmits interval message 120 about every one-hundred milliseconds. The length of time between intervals will vary with different configurations, but preferably should be longer than the time required to send and receive a message and to flush a page to a transaction log.

Each IP replies back to IC 110 with a "closure message" 125. Closure message 125 is generated in response to interval message 120, and indicates that the transaction log containing all log records created before receiving the interval closure record (i.e., log records for the current local interval) for the particular coserver has been flushed to disk. In addition, each time that any IP sends a closure message 125, that IP may enter a log record in the transaction log of the coserver indicating that the IP has completed the interval. However, to avoid filling the transaction log with empty log records, the IP only writes a close interval log record if transactions have been committed on that coserver during the interval. A more detailed explanation of the contents of interval message 120 and closure message 125 may be found in the discussion of FIGS. 12 and 13.

A new commit interval begins each time that a "master interval key" 150 in IC 110 is incremented. Master interval key 150 is like a clock which coordinates the activities IC of 110 and IPs 115a–115g. However, master interval key 150 need not be related to any real clock or be synchronized with real time. Instead, master interval key 150 is a counter that identifies the current commit interval. IC 110 reads master interval key 150 to determine the current commit interval number like a person reads a clock to find out the current time.

Preferably, master interval key 150 is a four byte, or larger, unsigned integer variable. A commit interval "ends" when master interval key 150 is incremented. Incrementing master interval key 150 also begins the next master interval.

The "end" of a commit interval is not necessarily the same thing as the "closure" of a commit interval. In the preferred embodiment, IC 110 waits a time period after sending out interval message 120. In each master interval, the wait period is set so that the total amount of time between successive interval messages is approximately one-hundred milliseconds. The exact amount of the wait period will depend on the duration of time spent processing closure messages during the previous master interval. The setting of the wait period will vary among implementations, but should be long enough to allow two message exchanges and a flush of a log to disk.

Any closure messages 125 that arrive during the wait time are placed in a queue. At the end the wait time period, IC 110 begins processing the messages in the queue. More interval messages might arrive and be placed in the queue during the processing. Eventually, however, IC 110 will empty the queue of closure messages. If every IP 115a–115g has sent in a closure message 125 then the interval is closed. If an IP, such as IP 115a, is prevented from sending a closure message, for example, if coserver 102a fails, then the interval will remain open. If the interval remains open, IC 110 will keep a record of the IPs that did not send closure records in memory 22d so that the interval may be closed at a later time. However, once the queue is empty, regardless of whether the interval remains open or is closed, master interval key 150 is incremented and a new interval begins.

IPs 115a–115g hold timer variables called "local interval keys" 155a–155g. The local interval keys act like local clocks for the IPs. Local interval keys 155a–155g store the most recent master interval and are updated by interval messages 120 from IC 110. Each interval message 120 from IC 110 includes a "master interval tag" which is equal to the current value of master interval key 150 of IC 110. IPs 115a–115g read the interval message 120, extract the master interval tag, and set their local interval keys 155a–155g equal to the master interval tag.

When an IP responds to an interval message 120 from IC 110 that contained a master interval tag of value N, the coserver associated with that IP has flushed to disk all transaction log records generated by the coserver during the previous master interval N–1. For example, if IC 110 sends an interval message 120-1a signaling the start of master interval #5, then when IP 115a replies with a closure message 125-1a, coserver 102a has flushed to disk all log records generated during master interval #4 (see FIG. 10).

In summary, in IC 110 there is a master counter (master interval key 150) that defines a master interval, and in each IP there is a local counter (local interval keys 155a–155g) that defines a local interval. The local interval key is updated when the IP receives an interval message from IC 110. Thus, each master interval on IC 110 generally runs from the transmission of a interval message 120 to the transmission of the next interval message. Similarly, each local interval generally runs from the receipt of an interval message to the receipt of the next interval message (see FIG. 10).

In addition to the regular exchange of interval and closure messages between IC 110 and IPs 115a–115g, for each distributed transaction there will be an exchange of messages between a transaction owner and the transaction helper. Specifically, the transaction owner will send a "request message" asking the transaction helpers to perform one or more operations in the transaction. For example, for the account transfer transaction, request messages 140a and 140b are sent to helpers 135a and 135b, respectively. Although coservers 102a and 102b are shown as helpers 135a and 135b, and coserver 102c as owner 130, the owner and helpers will be different coservers for different transactions.

Once a particular transaction helper has executed its operation, it replies back to the transaction owner with a "completion message", indicating that the operation has been completed. The completion message includes a "transaction interval tag" which is set to the value of the local interval key of the transaction helper. The transaction interval tag determines when the transaction owner can nominate the transaction to be committed, as will be explained below.

Hereafter, in the context of the exchange of request and completion messages, the owner and transaction helpers will be referred to interchangeably with the owner and helpers with which they are associated.

Each time that owner 130 receives a completion message from a helper, the owner compares the received new transaction interval tag to a stored old transaction interval tag and keeps the larger (equivalent to most recent) interval tag. Note that helpers may execute on the same node as the owner. The transaction tags are used even if the transaction updates occur on the same coserver as the owner of the transaction.

Once every helper has sent a completion message to owner 130, the owner may provide a completion response to the user. The transaction owner may request that additional tasks be completed for the current transaction, or the user may request that the transaction be committed or aborted. If the transaction owner requests a transaction commit, transaction owner 130 may initiate a check for deferred constraints. A deferred constraint is a rule that needs to be checked at the completion of a transaction. For example, if there is a minimum balance requirement in the checking account, this may be verified after the transaction. Deferred constraints will be discussed below, after the explanation of the commit protocol.

Next, owner 130 compares the stored transaction interval tag to local interval key 155c. If local interval key 155c is equal to or larger than the stored transaction interval tag, owner 130 marks the transaction as eligible for commit and includes a request to IC 110 to commit the transaction in the next closure message 125.

If the local interval key 155c is less than the stored transaction tag, there may be log records concerning the transaction that will not have been flushed to disk at the end of the current interval. In this case, owner 130 may wait and check again during the next interval to determine whether to include a request to IC 110 to commit the transaction in closure message 125.

Having owner 130 wait for the appropriate interval is necessary so that all of the transactions sent in a single closure message 125 are associated with a single interval. In an alternate implementation of the invention, owner 130 would not wait for an appropriate interval before requesting that the IC commit a given transaction. In such a case, the interval tag 252 (see FIG. 13) would have to be made specific to each transaction in a closure message to an IC as opposed to the preferred embodiment of the algorithm where the transaction tag is global to the closure message.

Sometimes, problems occur in the processing of user requests, and a transaction must be aborted. In some situations a helper may independently abort a transaction, but in other instances a helper cannot. A helper can independently abort a transaction if the helper is currently executing an operation for the owner by returning an abort status to the owner. A helper may also independently abort a transaction if the local interval tag is identical to the IP's current interval tag by adding the transaction to an abort list in the next closure message to IC 110.

In any other situation, a helper must request that the IC abort a transaction, either by sending the IC a separate message, or by adding an abort request to a closure message. In either case, there is no requirement that the IC honor the abort request because the IC may have already started commit processing for the transaction.

In the preferred embodiment of the invention, transactions can only be aborted by the transaction owner. Transaction helpers relinquish the autonomy to unilaterally abort transactions. This embodiment is appropriate for locally distributed database systems that function as a single server within a single administrative context.

FIG. 10 shows a time-line example of the exchange of messages between an owner, a helper, and the IC, for the account transfer transaction. The horizontal lines represent coservers 102a, 102c and 102d. The diagonal lines represent messages passing between the coservers. A user, such as a bank teller, may input the account transfer transaction at a coserver, such as coserver 102c associated with IP 115c. As noted above, because the transaction originates at coserver 102c, it acts as owner 130 for the transaction. Owner 130 determines that checking accounts table 32 is stored at coserver 102a associated with IP 115a, and savings accounts table 42 is stored coserver 102b associated with IP 115b (see FIGS. 8 and 9).

Interval messages 120 are sent out regularly from IC 110 on coserver 102d to the IPs on coservers 102a and 102c. Each IP replies to the interval message 120 with a closure message 125. For example, as shown in FIG. 10, coserver 102d sends interval message 120-1c to coserver 102c, and coserver 102c responds with closure message 125-1c.

In the example of the account transfer transaction, messages will be transmitted between coservers 102a, 102b, 102c and 102d. Because both coservers 102a and 102b are helpers, the messages to and from coserver 102a and 102b will be similar. Therefore, for simplification, the messages to and from coserver 102b are not shown in FIG. 10. This example also commences at master interval #4, but the principles are applicable to an earlier or later interval.

Beginning at time X on coserver 102a, IP 115a has just set its local interval key 155a to local interval #5 in response to interval message 120-1a from IC 110 requesting closure of master interval #4. IP 115a is about to reply with a closure message 125-1a to IC 110. As shown in FIGS. 10 and 11A, at time X IP 115a flushed transaction log 64a, thereby writing a log record 160 of the closure of local interval #4 to disk 24a.

Continuing with FIGS. 9, 10, and 11A, to execute a credit operation on checking accounts table 32, owner 130 transmits request message 140a to coserver 102a during local interval #5. Since IP 115a has just set its local interval key, request message 140a from owner 130 arrives at coserver 102a in local interval #5.

Once coserver 102a has completed execution of the credit operation, at time A, it enters log record 161 in a transaction log 64a. Log record 161 includes the transaction identification (ID) code and sufficient information to undo or redo the operation, such as the old and new values of entry 55. Log record 161 remains in memory 22a and is not yet flushed to disk 24a.

After coserver 102a enters log record 161 into transaction log 64a, it sends a completion message 145a to owner 130 on coserver 102c. The completion message includes a transaction tag set equal to current value, that is local interval #5, of the local interval key 155a on coserver 102a.

Although not shown in FIG. 10, as discussed above, the other helper and the owner will exchange request and completion messages to execute a debit operation on savings accounts table 42. However, if the debit were to cause the account to drop below zero, the debit operation would fail and the helper would send a message to owner 130 that the transaction resulted in an error. If the debit operation is successful, the helper will send a completion message to the owner, and coserver 102b will enter a log record into log 64b (see FIG. 8) with the transaction ID, the local interval in which the debit operation was completed, and the old and new values of entry 56 (see FIG. 4).

Returning to FIG. 9, owner 130 examines each completion message 145a and 145b to determine whether an error has been returned. If an error is received from helper 135a or 135b, then owner 130 marks the transaction as aborted. Assuming that completion message 145a arrives at owner 130 before completion message 145b, owner 130 will store the transaction interval tag from completion message 145a in memory 22a. When the next completion message 145b arrives at owner 130, owner 130 compares the new transaction interval tag from completion message 145b to the stored transaction interval tag from completion message 145a. If the received new tag is larger than the stored old tag, then the stored tag is replaced by the new received tag. In this example, coservers 102a and 102b both sent completion messages in local interval #5. Therefore, owner 130 will store local interval #5 from completion message 145a as the stored transaction interval tag. When completion message 145b arrives, no change will be made in the stored transaction interval tag.

Next, owner 130 compares the stored transaction interval tag to the local interval key 155c. If local interval key 155c is equal to or larger than the stored transaction interval tag then owner 130 marks the transaction as ready for commit. In this example, both the stored transaction interval tag and the local interval of owner 130 both have a setting of interval #5. Because the local interval is equal to the stored transaction interval tag, the transaction is marked as ready for commit.

The stored transaction interval tag can be larger than the local interval in one situation. Suppose, at the beginning of an interval, IC 110 sends an interval message to a helper which is busy executing an operation. The helper might complete the operation and send its completion message 145a to owner 130 before owner 130 finishes processing interval message from the IC to the owner. In this case, the owner has not yet incremented its local interval key, so the transaction interval tag will be larger than the local interval key. If this occurs, owner 130 will submit the commit request at the end of its next local interval.

When IP 115c builds closure message 125-2c, IP 115c will note that the account transfer transaction is ready for commit, and will add a commit request to closure message 125-2c noting that the transaction as eligible for commit.

Referring to FIGS. 10 and 11B, at time B, before IP 115a sends closure message 125-2a, IP 115a will flush transaction log 64a to place log record 161 on disk. Then IP 115a will add a log record 162 indicating the closure of local interval #5 to buffer 22a.

When IC 110 receives closure message 125-2c, it determines that the account transfer transaction is eligible for commit. At the close of master interval #6, IC 110 compares its list of IPs that sent closure messages during that interval to the list of participants that were involved in the transaction. As shown in FIG. 10, both IP 115a associated with coserver 102a and IP 115c associated with coserver 102c sent closure messages 125-2a and 125-2c in response to interval messages 120-2a and 120-2c, respectively. Assuming IP 115b on coserver 102b also sent a closure message to IC 110, the account transfer transaction will be marked in a transaction state list 170 (FIG. 8) in volatile memory 22d as committed.

Turning to FIG. 19, transaction state list 170 in memory 22d is a list of transactions records 410. Each transaction record 410 includes at least an owner ID code 411, a transaction ID code 412, a transaction interval tag 413, a transaction state 414, and a transaction participant list 415. For example, the account transfer transaction as just described has an owner code #102c, transaction ID #312, an interval tag of interval #5, a state of commit, and lists coservers 102a–102c as participants in the transaction.

As shown in FIG. 10, at the close of master interval #6, IC 110 assembles interval messages 120-3a and 120-3c. Once interval messages 120-3a and 120-3c are assembled, IC 110 flushes to disk 24d transaction state list 170 (see FIG. 8). At this time, the transaction is committed. Regardless of any later failures (except actual destruction of the non-volatile storage), a consistent database 30 can be provided by undoing the aborted transactions and redoing the committed transactions. Because IPs 115a115c sent in closure messages after the records of the old and new values of the database entries were successfully flushed to disk, when IC 110 marks the transaction as committed, the necessary information to reconstruct database 30 has already been saved in non-volatile storage.

Once IC 110 flushes the transaction state list to disk 24d, at the beginning of master interval #7, an interval message is transmitted to each IP 115a–115g. Interval messages 120-3a and 120-3c will contain a list of committed and aborted transactions. The account transfer transaction (tr #312) will be in the commit list.

As shown in FIGS. 10 and 11B, after IP 115a receives interval message 120-3a, it will enter a log record 163 in transaction log 64a noting that transaction ID tr #312 was committed.

Referring to FIGS. 10 and 11C, at time C, before IP 115a sends its closure message to IC 110, IP 115a will flush log 64a to disk 24a and then add a log record 164 to buffer 22a indicating the closure of local interval #6. However, an IP is only required to flush the log if transaction log records were written in the last local interval. This completes the distributed transaction commit protocol of distribute database system 5.

A deferred constraint check may be carried out in a manner similar to a commit. When a user requests a commit of a transaction that has deferred constraint checking, the transaction owner will request that IC110 initiate the evaluation of those deferred constraints prior to processing the commit of the transaction. When IC 110 receives the deferred constraint check request in closure message 125, it takes several actions. First, it adds the transaction to a separate list of transactions that need constraint checking. The list is used to keep track of which participants have completed the constraint check. Second, the IC changes the state of the transaction in list 170 to DEFERRED. Third, once all of the participants have sent closure messages for the interval indicated by the transaction's interval tag value, the IC includes a check request for the transaction in the next interval message 120.

When each participant receives the check request in interval message 120, it evaluates the deferred constraints for the specified transaction. The constraint check could require multiple local intervals to complete, but once each participant is finished, it inserts the outcome into a closure message. If IC 110 receives a constraint failure from a participant, then the transaction will be marked as aborted. If no participant has a constraint violation, then once every participant replies, the transaction will be marked as to be committed, and the transaction protocol will continue as has been described above.

Message Exchange

FIGS. 12 and 13 show the structure of the possible messages that may be transmitted between IC 110 and IPs 115a–115g.

As shown by FIG. 12, any message from IC 110 to one or more IPs 115a–115g will begin with a one-byte message type 200. A normal message type is TRANSACTION, which indicates a normal request for the IPs to respond with a closure messaged 120. Other possible message types that an IC can send to an IP include:

READY REPLY
If an IP sends a READY message to IC 110, then IC 110 responds with a READY REPLY message containing the current master interval tag 202.

ICREADY
If IC 110 failed and was unavailable, when it is restored it will broadcast an ICREADY message to all IPs 115. This alerts the IPs that IC 110 is available again and needs to confirm the state of each IP. The location of IC 110 may have changed, for example, if a backup IC assumed control. Therefore, the ICREADY message also includes an identification of the current coserver running IC 110.

UPDATE
If an IP sends an UPDATE REQUEST message to IC 110, then IC 110 will respond with an UPDATE message to the specific IP. This message contains the master interval tag and a status list of the state of all transactions in which that coserver was a participant.

RECOVERY REPLY
If a particular IP fails and is later restored, it will send a RECOVERY message to IC 110. In response, IC 110 sends a RECOVERY REPLY to the IP. This message contains the master interval tag and a status list of the state of all transactions in which that coserver was a participant.

SUSPEND

This message alerts an IP that IC 110 is suspending TRANSACTION messages to that IP because too many intervals have closed since the last closure message from that IP.

In the interval message 120 shown in FIG. 12, a four-byte master interval tag 202 follows state 200. Master interval tag 202 is the latest closure interval taken from master interval key 150. Four flags 204–207, occupying a single one-byte field, follow tag 202. The flags indicates whether interval message 120 includes any transactions to commit (flag 204), abort (flag 205), or perform a constraint check (flag 206). Flag 207 indicates whether IC 110 has been informed of any failed coservers.

Following flags 204–207 are, in order, the commit list 210, abort list 212, check constraint list 214, and failed coserver ("down") list 216. Commit list 210, abort list 212, and constraint check list 214 all have the same organization. Each list begins with a two byte count 220 of the transaction owners in list. Then, for each owner, a two byte owner ID 222, a two byte count 224 of the number of transactions of that owner, and a transaction ID list 226 for that owner are provided. Transaction ID list 226 takes four bytes per transaction.

Interval message 120 may also contain other global database system context information. For example, a global time of day value could be distributed for the purpose of loosely synchronizing the time clocks on the various coservers. Naturally, the recited field sizes for the messages are merely exemplary, and not necessary to the invention. The field sizes may be selected to reflect the transaction processing capabilities of a given computer network.

As shown in FIG. 13, any message 125 from the IPs to the IC will begin with a one-byte message type 250. The normal message type is TRANSACTION, which indicates a normal closure response to the IC. However, other possible message types include:

RECOVERING

IPs send a RECOVERY message to IC 110 to obtain current transaction information.

READY

If an IP was quiescent and is now available, then it will send a READY message to IC 110. This alerts IC 110 that the IP is available for transaction processing.

UPDATE REQUEST

An IP sends an UPDATE REQUEST message to IC 110 after receiving a SUSPEND message from IC 110.

IDLE

A particular IP 115a alerts IC 110 that it is going idle by sending an IDLE message. An IP goes idle when a significant number of local intervals lapse and there are no outstanding active transactions or transaction activity on the coserver associated with that IP.

IC UPDATE

In response to an IC READY message from IC 110, an IP sends an IC UPDATE message containing information transmitted in a previous transaction message from that IP to the IC. This information may not have arrived due to failure of IC 110.

RECOVERY COMPLETE

Following a failure, after any open transactions are resolved by the IP and close interval records have been flushed to disk, the IP sends a RECOVERY COMPLETE message to IC 110. IC 110 then alters all stored interval closure records to show the particular IP as closed and alters a transaction state list to remove the IP from any transactions in which it participated.

In the closure message shown in FIG. 13, following type 250 is a four-byte local interval tag 252. Local interval tag 252 is the interval taken from the local interval key. A two byte interval participant ID 204 follows tag 252. Four flags 256–259, occupying one byte, follow interval participant ID 254. The flags indicate whether the interval message includes any transactions which are eligible to commit (flag 256), requested to be aborted (flag 257), or which require a constraint check (flag 258). Flag 259 indicates a reply to a constraint check.

Following flags 256–259 are, in order, the eligible commit list 260, abort list 262, and check constraint list 264, and constraint reply list 266. Commit list 260, abort list 262, and constraint check list 264 all have the same organization. Each list begins with a two byte count 270 of the number of transactions in the list. Then, for each transaction, a four byte transaction ID 272, a two byte count 274 of the number of participants in the transaction, and a participant list 276 for that transaction are provided. For systems with less than forty coservers, participant list 276 will be a bitmap in which each bit represents one coserver. For systems with more than forty coservers, participant list 276 will either be a bitmap or a list of participants IDs taking two bytes per participant, whichever requires fewer bytes. The first bit 277 in participant list 276 indicates which format is being used.

The IP interval closure message 125 also contains a reply list 266 with the results of the evaluation of deferred constraints by the transaction participants. Reply list 266 has a slightly different structure. Reply list 266 begins with a two-byte count 280 of the number of transactions in the list. Then, for each transaction, there is a two-byte transaction owner ID 282, a four byte transaction ID 284, and a one-byte flag 286 indicating whether the constraint check was a success or failure.

Closure message 125 contains an interval tag 252 so that IC 110 knows the local interval in which the closure message was transmitted. Interval tag 252 applies globally to each of the transactions identified in the lists 260, 262, 264 and 266 of the closure message 125.

The IDs for aborted transactions in list 260 and transactions that are eligible to commit in list 262 will be added by IC 110 as the most recent transactions in transaction state list 170 maintained in memory 22d (see FIG. 8). IC 110 will refer back to transaction state list 170 when generating the next interval message 120.

Interval Coordinator and Interval Participants

As shown in FIG. 14, during each master interval, IC 110 takes the following steps:

| | | |
|---|---|---|
| 1. | Wait for End of Timer | (step 301) |
| 2. | Process Message in Queue | (step 302) |
| 3. | Determine whether Queue is Empty | (step 303) |
| 4. | Process Transaction State List | (step 304) |
| 5. | Flush Transaction State List to Disk | (step 305) |
| 6. | Transmit Interval Message | (step 306) |
| 7. | Increment Master Interval Key | (step 307) |

IC 110 begins a new master interval in step 301 by waiting for a timer 185 in memory 22d (see FIG. 19) to expire. Waiting for the expiration of timer 185 allows the IPs to respond to the interval messages 120 sent during the previous master interval and reply back to IC 110 with closure messages 125. Each closure message reaching IC 110 is placed into a queue 180 in memory 22d (see FIGS. 8 and 19). Timer 185 is set to ensure that a minimum amount of time, such as one-hundred milliseconds, has passed from the beginning of the previous interval. Once timer 185 expires, or if timer 185 already expired, then it is reset by adding a minimum amount of time, such as one-hundred milliseconds, to the current time.

It is also possible for IC 110 to process messages from the IPs in an incremental fashion. In such a case, IC 110 would simply wait for a new closure message to arrive or for timer 185 for the current master interval to expire.

After timer 185 has expired, in step 302, IC 110 begins to process any closure messages in queue 180 (see FIG. 19). While IC 110 is processing, it is possible for more closure messages to arrive from IPs 115a–115g. These closure messages 125 are placed at the end of queue 180 and will be processed in turn.

IC 110 continues to process closure messages until queue 180 is empty as determined by step 303. Because each IP will only send out one closure message and then wait for a new interval message from IC 110 (see step 351 in FIG. 17), only a finite number of closure messages 125 will accumulate in queue 180. It is possible that an IP, such as IP 115a, will not be able to send IC 110 a closure message in time, for example if coserver 115a fails or is under a heavy processing load from some other source. In such a case, IC 110 will not be able to close the interval (but will end the interval, as described above), and IC 110 will store a bitmap of the coservers which did not respond during that interval.

Processing step 302 will be explained in detail below with reference to FIGS. 15 and 15A, but, in brief, during this processing step the closure messages 125 are examined and transactions in commit list 260, abort list 262, check list 264, and reply list 266 are placed into transaction state list 170. In addition, abort list 212 is assembled for interval message 120.

Once all of the closure messages in queue 180 are processed, the transaction state list 170 that was just created is processed. Processing step 304 will be explained in detail below with reference to FIGS. 16 and 16A, but, in brief, during this step, the IC evaluates whether to commit transactions. In addition, in step 304, commit list 210 and check list 214 are assembled for interval message 120.

In step 305, IC 110 flushes critical transaction information to disk 24d (see FIG. 8). This information includes master interval key 150, transaction state list 170, an open interval array 425 (to be described below) showing which participants have send closure messages, and a last tag array 435 of local interval tags. Array 435 contains an entry 436 for each coserver 102a–102g. Each entry 436 contains the most recent local interval tag 252 received from the appropriate coserver.

If distributed database system 5 includes backup ICs, then between processing step 304 and flushing step 305, a copy of the critical transaction information will be sent from IC 110 to the active backup IC. The use of backup ICs will be explained below with reference to FIG. 21.

Once transaction information is flushed to disk 24d, in step 306 interval message 120 is transmitted to IPs 115a–115g. In the preferred embodiment, the same interval message is sent to each IP. However, by adding additional processing load to the IC, it would be possible to send different interval messages that are optimized specifically for each IP.

There are many methods for sending messages to multiple sites. Interval messages can be sent serially, that is, to one IP at a time. Preferably, if supported by hardware, a single interval message 120 could be broadcast, that is, to all IPs 115a–115g simultaneously. Also, broadcast could be simulated through a software implementation. Alternately, particularly if there are a large number of IPs, a tree transmission could be used. The invention applies to any method for transmitting interval message 120 to all IPs 115a–115g.

The interval message sent in step 306 contains the master interval tag 202 taken from master interval key 150 which will be used by IPs 115a–115g to reset their local interval keys 155a–155g. This ensures global consistency of the local interval keys. In a non-preferred embodiment, each IP could increment its own local interval key in response to each interval message 120.

Finally, in step 307 IC 110 increments master interval key 150 to indicate the start of a new master interval, and loops back to step 301 to wait for the arrival of closure messages in response to the interval message that was sent in step 306.

In summary, IC 110 is responsible for the central coordination of distributed transaction commits and aborts, and deferred constraint checking within database system 5. IC 110 will initiate the commit interval, determine and record the instance a transaction is committed or aborted, maintain the master interval key, manage distributed deferred constraint checking, maintain the commit or abort status of all distributed transactions, and maintain the state of all participants in the database system 5.

As shown by FIG. 15, in step 302 the IC processes individual closure message 125 in queue 180. IC 110 begins in step 310 by tracking which coservers have responded to the most recent interval message 120.

At the beginning of each master interval, for example, in step 301, IC 110 creates an interval record 420 in open interval array 425 (see FIG. 19). Interval record 420 includes an interval tag 421 which is set to the current master interval key 150. Interval record 420 also includes an interval bitmap 422 having a number of bits equal to the number of coservers in database system 5 (see FIG. 19). For example, in example database system 5 with seven coservers, the interval bitmap 422 would have seven bits. When the interval bitmap 422 is created, the bit for each active coserver is set to "on"; the bits for the suspended coservers are set to "off". In step 310, IC 110 notes the interval participant ID 252 from closure message 125 and turns the bit in interval bitmap 422 for that coserver off. At the end of each master interval, if every coserver has sent a closure message, then that interval is closed and IC 110 may erase interval record 420. Otherwise, the master interval remains open, and IC 110 stores the interval record 420 in open interval array 425.

Then, in step 311, IC 110 determines whether it has finished processing the transactions in closure message 125. This would occur immediately if lists 260, 262, 264, and 266 were empty. Otherwise, IC 110 will be finished only after each transaction is examined and processed.

Assuming that there are more transactions to process in closure message 125, then in step 312 the IC determines if the transaction is from check reply list 266. If this is a check reply list transaction, then in step 313 the IC carries out a check reply subroutine which will be described below with reference to FIG. 15A.

If the transaction is not a check reply, then in step 314, the IC adds a transaction record 410 to the transaction state list 170. Referring to FIGS. 13 and 19, the owner ID 411 is taken from owner ID 254, transaction ID 412 is taken from transaction ID 272, transaction interval tag 413 is taken from local interval tag 252, and participant list 415 is taken from list 276. The list of participants is in the form of a bitmap, with one bit for each coserver. Those coservers which are participants have bits in the bitmap 415 switched "on". The state 414 of the transaction is initially determined by flags 256–258 as request commit, abort, or request check, but may be changed by IC 110 as explained below.

Returning to FIG. 15, in step 315 the IC determines if the transaction is from commit list 260. If so, then IC 110 continues to the next transaction in step 320 and no action is taken. If not, then in step 316 the IC determines if the transaction is from abort list 262 of closure message 125. If this is an abort transaction, then, in step 317, the transaction in abort list 262 is added to abort list 212 for the next interval message 120, assuming the preferred embodiment in which only the owner can generate an abort. In an alternate implementation of this invention, a transaction participant could unilaterally generate abort requests to the IC. In such cases, the IC must wait until the end of the master interval and check a list of transactions that are candidates for abort against a list of transactions that are eligible for commit. The IC would only initiate abort processing as requested in the case when commit processing for that transaction had not already been initiated. If the IC decided to abort the transaction, the transaction would be added to abort list 212. Once the abort list, if any, has been updated, IC 110 moves to step 320.

If the transaction is not from abort list 262, then in step 318 IC 110 determines whether the transaction is from the request for constraint check list 264. If so, then in step 319 the IC adds a reply record 440 to a check array 445. Check reply array 445 is maintained by IC 110 to determine whether all of the participants to a transaction have completed the deferred constraint check. Each time IC 110 receives a closure messages 125 containing a reply list 266 specifying a transaction in table 440, e.g. #312, IC 110 marks a bit associated with that participant as having replied. Once all of the participants to a transaction have replied, and no constraint failure is reported, that transaction may be committed. Each reply record 440 includes a transaction ID 441 and a bitmap list of participants 442. When bitmap 442 is created, the bits for the participants are set on, and the bits for the non-participants are set off. For example, as shown in FIG. 19, if a deferred check is required for the account transfer transaction, and coservers 102a–102c are expected to, but have not yet, the bits for coservers 102a–102c are still set on, and the bits for coservers 102d–102g are set off. As explained below, each time that a participant sends a check constraint reply, the bit for that participant will be set off. Once all the bits in bitmap 442 are off, assuming no constraint failures, the transaction may be committed. After reply record 440 is added to check reply array 445, IC 110 continues processing the closure message in step 320.

Regardless of which list the transaction is from, in step 320 the IC moves to the next transaction message. Otherwise, IC 110 is finished with that closure message, and proceeds to step 303 and move to the next message in queue 180.

Referring to FIGS. 15A and 19, if the transaction was listed in check reply list 266, then in step 321, the IC determines whether a failure occurred. If flag 286 for the transaction in reply list 266 indicates a failure, then in step 322 the state 414 in transaction state list 170 is changed to ABORT, and in step 323 the transaction is added to abort list 212. Then the IC continues with processing closure message 125.

If the constraint check at the participant which sent closure message 125 was successful, then in step 324, the bit in bitmap 442 corresponding to the coserver which send closure message 125 is turned off, as previously discussed. Then, in step 325, the IC determines whether all of the participants have completed the constraint check. If all of the bits in reply bitmap 442 are off, then reply bitmap 442 will equal zero, and the transaction may proceed to be committed. In step 326 the state 414 of the transaction is changed to COMMIT and in step 327 the transaction is added to commit list 210. If the bitmap 422 contains any on bits, then the IC continues processing the closure message.

As shown in FIG. 16, in step 304 the IC processes transaction state list 170 to commit transactions and create commit list 210 and check list 214. For each transaction, beginning in step 330, IC 110 starts at the bottom (oldest record) of interval array 425. Then, in step 331, IC 110 compares the transaction tag 413 to the open interval tag 421. If transaction tag 413 is larger than open interval tag 421, then the transaction is left unaltered in list 170.

If transaction tag 413 is equal to or smaller than open interval tag 421, then in step 332 the IC determines whether every participant in the transaction has sent a closure message for that interval. This is done by a comparison of bitmaps. The participant list 415 for the transaction entry 410 is stored in the form of a participant bitmap, with each coserver that is involved in the transaction represented by a bit set on; the coservers which are not participants are represented by bits set off. Participant bitmap 415 is "ANDed" with the interval bitmap. That is, a boolean AND operation is performed on the participant bitmap and interval bitmap.

For example, as shown by FIG. 19, in the account transfer transaction, the participant bitmap 415 would have three on bits on for coservers 102a, 102b and 102c, and four off bits for coservers 102d–102g. When the interval bitmap 422 is created for master interval #6, it would have seven on bits, one for each coservers 102a–102g. As IC 110 receives closure messages 125, the appropriate bits in interval bitmap 422 would be set off. For example, when IC 110 receives closure message 125-2a for interval #6, the bit for coserver 102a would be set off. Assuming coservers 102a–102c transmit closure messages, then, as shown in FIG. 19, the bits for those coserves in bit map 422 for interval #6 would be set off. In such a case, the result of the AND operation will be seven off bits, that is zero. If one or more of the coservers 102a–102c does not respond, the result will contain on bits and be non-zero.

As shown in FIG. 16 in step 335, if the result of the AND operation is zero, then all of the participants in that transaction have closed the specified interval 421, and the transaction can change state. In this case, IC 110 continues to process the transaction.

In step 340 (FIG. 16A) the IC determines whether the transaction state indicates that transaction is committed or aborted. If transaction state 414 is COMMIT or ABORT, then in step 341 the transaction is removed from list 170. These transactions may be removed from list 170 because the IPs involved in the transactions are guaranteed to have commit or abort log records to their local transaction logs 64a–64c and the log records have been flushed to disk. Once all the local transaction logs have been updated with such commit or abort records, IC 110 no longer needs to remember the state of the transaction. IC 110 can "forget" about these committed transactions since the coservers for all the transaction participants are guaranteed to be able to locally resolve any ambiguities regarding the final state of those transactions without any further assistance from the IC.

If transaction state 414 is not COMMIT or ABORT, then in step 342 the IC determines whether a deferred constraint check has been requested. If transaction state 414 is REQUEST CHECK, then in step 343 the state is changed to DEFERRED, and in step 344 the transaction is added to check list 214. In an alternate embodiment, the reply record 440 may be added to check reply array 445 at this point, rather than as part of step 302 (see FIG. 15).

If transaction state 414 is not REQUEST CHECK, then in step 345 the IC determines whether the IP has requested a commit of a transaction. If transaction state 414 is a REQUEST COMMIT, then in step 346 the state in list 170 is changed to committed. Then, in step 347, transaction tag 413 in transaction state list 170 is altered. Specifically, transaction tag 413 is revised so that it equals the current master interval key 150 plus a delay valve, specifically one. This setting of the interval tag 413 for the committed transaction in 410 indicates when IC 110 can "forget" about the transaction because the information will be stored in non-volatile storage in the participants. In step 348, the transaction is added to commit list 210.

Because an IP flushes its disk before sending a closure message, all log records in database system 5 that are associated with an arbitrary interval N have been flushed to disk by the time that IC 110 closes interval N. Therefore, a transaction with a commit request state which is tagged with interval N or earlier may be committed by IC 110 once interval N is closed, that is, every IP has sent in a closure message.

If the transaction state in step 338 is not REQUEST COMMIT, then no action is taken. All other transaction states are ignored and do not require explicit action at this time by the IC, i.e., step 349.

Finally, in step 336, the IC determines whether there are any more transactions in transaction state list 170. If IC 110 has processed the last transaction, then it continues with step 305. If there are more transactions, then in step 337 the IC moves to process the next transaction record 410 and loops back to step 330.

If transaction tag 413 is greater than interval tag 421, or if AND result is non-zero, then in step 333, IC 110 determines whether it has analyzed the last (youngest) record 420 in open interval array 425. If not, then in step 334 the IC moves to the next open interval and returns to step 331 to repeat the process.

As shown in FIG. 17, during each local interval, each IP takes the following steps:

| 1. | Begin to Flush Transaction Log Buffer | (step 351) |
|---|---|---|
| 2. | Analyze Interval Message | (step 352) |
| 3. | Build Closure Message | (step 353) |
| 4. | Write Close Interval Log Record | (step 354) |
| 5. | Wait for Log Buffers to Flush to Disk | (step 355) |
| 6. | Send Closure Message | (step 356) |
| 7. | Wake-Up Transaction Session | (step 357) |
| 8. | Wait for Interval Message from IC | (step 358) |
| 9. | Update Local Interval Key | (step 359) |

Each time an owner starts a new distributed transaction, or each time a helper receives a request message, the transaction is entered as a record 470 into a local transaction state table 480. The transactions state table may be formatted as a hash table. As shown in FIG. 20, each record 470 in hash table 480 includes a global transaction ID 471, a local transaction ID 472, a tag 473 showing the local interval in which the transaction last changed state, a field 474 identifying the state of the transaction as REQUEST COMMIT, COMMITTED, ABORTED, REQUEST CHECK, or DEFERRED, and an identifier 475 of the session to alert when the transaction changes state. The Session ID 475 is used for purposes of internally identifying the correct transaction participant that should be notified by the IP of a change in the state of a transaction as the result of an interval closure message 120 from the IC. Hash table 480 serves as a list of the active transactions in which the coserver is a participant.

An IP, such as IP 115a, begins a local interval by receiving an interval message from the IC in step 358 of FIG. 17. The IP assigns the value of the master interval contained in the interval message from the IC to it's local interval key in step 359. Next, in step 351, the IP initiates an asynchronous flush to disk 24a of the contents of transaction log 64a in buffer 60a. The transaction log flush is requested immediately to overlap the delay caused by disk writing with the time that the IP processes the interval message.

After the flush to disk 24a has begun, in step 352 IP 115a analyzes the interval message 120 it has received. Processing step 352 will be explained in detail below with reference to FIG. 18, but, in brief, during this processing step the interval messages 120 is examined and any transactions in commit list 210, abort list 212, check list 214, and down list 216 with which the coserver was involved are acted upon. In step 352, the IP's transaction state table is updated to indicate the transactions that will change state as the result of the interval closure message that has just been received from the IC. Also, in step 352 a temporary changed state stack 465 is created which is used in step 357 to alert specific participants associated with transactions that have changed state. In addition to committing and aborting these transactions, IPs 115a–115g will, either directly or via the transaction participants, release any local locks for the marked transactions.

In step 353 the IP builds closure message 125 by combining request commit list 260, abort list 262, request check list 264, and check reply list 266 with the necessary header information (message type 250, local tag 252, IP identification 254, and flags 256–259).

Commit list 260, abort list 262, and request check list are created on behalf of transaction owners by the IP. The check reply list 266 is created on behalf of transaction participants. Each time that a transaction owner or participants has instructions or information regarding a particular transaction participants for the IC, the transaction owner calls a routine in the IP to add the transaction to the appropriate list.

Once the transaction owner receives completion messages 145 from each participant session, the transaction is at a point at which a commit evaluation could be begun, either implicitly or due to an explicit request from a user. If the transaction does not require a deferred constraint evaluation, then the transaction owner will call a routine in IP 115c to add the transaction into the request commit list 260.

For example, referring to FIG. 10, when owner 130 received completion message 145a from coserver 102a and received a request to commit the transaction, IP 115c notes that there are no deferred constraints, changes the state of the transaction to request commit, and adds the account transfer transaction to the request commit list 260 in closure message 125–2c.

Similarly, if the user decides to abort a transaction, or if a constraint check fails, then the transaction owner will call a routine in IP 115c to add the transaction to abort list 262.

If a commit has been requested, but deferred constraints exist, the transaction owner will call a routine to add the transaction to check request list 264. Then a constraint check request will be sent to IC 110 just as a request for commit or abort would be. Then IC 110 will send a check message to all the participants in the transaction instructing the participants to carry out a constraint check and report the results. If no coserver has a constraint violation, then IC 110 will commit the transaction, without an explicit request by owner 130.

Transaction participants, including the transaction owner, complete constraint checking in response to a check request from IC 110. Whether or not the check was successful or unsuccessful, the transaction participant will call a routine to add the transaction to check reply list 266.

Returning to FIG. 17, after closure message 125 has been built, in step 354 the IP enters a "close interval" log record in the transaction log that the IP responded to the IC for the interval being closed. The close interval log record contains the interval number and a list 455 of the transactions committed and aborted in that interval. Although writing step 354 is shown occurring after building step 353, writing step may occur any time prior to wakeup step 357. In an alternate embodiment, writing step 354 and waiting step 355 occur before building step 353.

In step 355 the IP waits for buffer 60c, containing the log records for the last local interval, to flush to disk 24c. Although the flush was started in step 351, it may not have completed prior to step 355. By waiting for buffer 60c to flush before continuing, IP 115c ensures that when it sends its closure message, all log records for that local interval are in non-volatile storage and will not be lost in the event of a failure. Then, in step 356, the IP sends closure message 125 to IC 110.

After closure message is transmitted to IC 110 in step 356, in step 357 the IP alerts the transaction participants whose transactions have changed state. The IP examines each record 460 in changed state stack 465 and informs the appropriate transaction participant so that it may take appropriate action, such as informing a user that a transaction has been committed. Although shown as a separate data structure, changed state stack 465 may simply be a set of links in transaction state table 480 connecting the transactions that have changed state. Each link can be a pointer in record 470 pointing to another record 470. In such a case, the IP would alert the transaction participants by moving through hash table 480 by following the links.

Once alerted, if the transaction has been aborted, the transaction participant will undo its operations and enter an abort log record in transaction log 64c. If the transaction is committed, the transaction participant will enter a commit log record in transaction log 64c. If the new state is REQUEST CHECK, then the transaction participant may begin a constraint check.

As described above, if the transaction has been successfully constraint checked, the transaction will be included in the next closure message 125 in check reply list 266. If the transaction was not successfully constraint checked, the transaction will be included in the next closure message 125 in check reply list 266 as a failure.

In waiting step 358 the IP waits indefinitely for the next interval message from IC 110. Database system 5 will use backup ICs, described below with reference to FIG. 21, to detect and respond to failures in IC 110.

It may be noted that the waiting state in step 358 is the initial state of the IP. Only after an interval message is received does the IP depart from waiting state and begin interval processing.

After an IP, such as IP 115a, receives an interval message from IC 110, in step 359 the IP resets the local interval key 155a with the master interval tag 202 specified in the interval message 120. Then the IP begins the new local interval by looping back to step 351 to request a flush of the transaction log.

In summary, each IP sends closure message 125 in response to interval message 120 from IC 110, writes a close interval log records, maintains a local interval key, and alerts transaction participant when the state of a transaction has changed. Transaction participants are responsible for constraint checking and writing commit and abort log records to transaction logs 64a–64c.

As shown in FIG. 18, in step 352 the IP analyzes interval message 120. Beginning with step 371, an IP, such as IP 115c, examines transactions in transaction state table 480 to determine whether coserver 102c is a participant in the next transaction in interval closure message 120. If coserver 102c was not involved in the transaction, IP 115c moves to the next transaction in interval message 120.

If coserver 102c was involved in the transaction, then in step 372 IP 115 changes the state 474 in hash table 480. Specifically, depending whether the transaction is in commit list 210, abort list 212, or check request list 214, the state 474 will be changed to COMMIT, ABORT, or REQUEST CHECK, respectively.

After changing state 474, in step 373 committed and aborted transactions are removed from the transaction state table and added to the changed state stack 465. Transaction participants involved in deferred constraint checking are alerted to start the constraint check.

Assuming coserver 102c participated in the transaction, in step 374 the IP determines whether the transaction state has been changed to COMMIT. If so, then in step 375 the transaction is added as a commit record 450 to a commit list 455 (see FIG. 20) which will be copied to the transaction log and to disk 24c as part of the close interval record.

In step 376 the IP determines whether the transaction is complete. Transactions which are classified in the lists of IC message 120 as COMMIT or ABORT are considered complete, those that are classified as DEFERRED CHECK are considered to still be active transactions. If the transaction is complete, then in step 377 transaction record 470 may be removed from hash table 480.

If there are no more transactions, as determined in step 378, then the IP has completed its analysis and moves on to step 353. Otherwise, the IP moves to the next transaction in step 379.

In a busy system, IP 115d running on coserver 102d may be unable to respond to closure messages 120 in a timely manner. For example, coserver 102d may be executing an extremely complicated set of operations which consumes its processing power. If IP 115d misses a threshold number of intervals, for example, fifty to one-hundred intervals, then IC 110 will suspend IP 115d and cease sending interval messages to IP 115d. If IP 115d is sent a SUSPEND message, it is marked as inactive. When IP 115d is able to respond, the IP can send an UPDATE REQUEST message to IC 110 and the IC will respond with an UPDATE message. This will allow IP 115d to catch up to the current interval without processing all the interval closure messages it missed.

Suspending IP 115d and allowing it to update at a later time mitigates two costs that occur when a coserver is unable to process all interval messages in a given period of time. The first cost is that IP 115d would otherwise need to process every intervening interval message to become current. The second cost is that IC 110 must maintain a record for every interval to which an IP has not responded.

When IPs 115a–115g are inactive, IC 110 can enter an idle state in order to conserve network resources. An IP, such as IP 115a, is considered active from the time when a distributed transaction begins executing on coserver 102a until IP 115a sends an IDLE message, is suspended by IC 110, or fails and is taken off line. An IP can go IDLE, and send an IDLE message to the IC if it has not been a transaction participant for a specified period of time, e.g. 100 intervals. Under normal operating conditions, the wait step 301 call will end automatically at the expiration of the timer. IC 110 can enter an idle state if there are no active IPs. In the idle state, IC 110 discontinues interval processing and instead will wait indefinitely for a message from an IP. IC 110 will wake up only often enough to transmit a message to its backup IC (discussed below with reference to FIG. 21) in order to monitor the health of IC 110.

Recovery

Two failure scenarios effect IC 110 directly: failure of the coserver on which the IC 110 is running, or a complete failure of the database system. To protect against both of these failures, critical information is written to disk 24d, assuming for purposes of this explanation that IC 110 is running on coserver 102d, by IC 110 at the close of each master interval.

In database system 5, a transaction is committed once the transaction state list 170 has been copied by IC 110 to non-volatile storage. However, IC 110 need not keep a commit record permanently. Preferably, as will be explained below, IC 110 keeps only a "snap shot" of the transaction state for the previous master interval, rather than traditionally logging such transaction state to permanent storage. Once IC 110 informs IPs 115a–115g that a transaction is committed or aborted, the participants will store that information in their local transaction logs. Once IC 110 receives a closure message from each participant, IC 110 knows that the commit or abort record was flushed to the respective logs on disks 24a–24g of every coserver that participated in a given transaction. Therefore, each coserver will be able to persistently resolve the final state of a given transaction without further reference to the IC. At such point, the IC need no longer maintain the final state of a transaction in its "snap shot" of the system's transaction state on disk 24d. Therefore, in database system 5, IC 110 is responsible for maintaining a record of the state of a transaction as committed or aborted until each participant has flushed a log record of the state to its transaction log, whereas the individual IPs are responsible for permanent logging of commit and abort records in their local transaction logs.

IC 110 uses a double buffering scheme to insure the presence of a complete and accurate copy of the system's current transaction state on disk at all times. For example, if IC 110 has flushed the log records for master interval #5 to one location on disk, then at the close of master interval #6, IC 110 will write the log records to a different location on disk. After the log records have been flushed, the data for master interval #5 is marked as old so that disk space may be used for master interval #7. If a write to disk fails during master interval #7, or if the database system 5 crashes while the log records of master interval #7 are being written, then the log records for master interval #6 will still be complete, accurate, and sufficient for the subsequent proper operation of IC 110.

Every coserver in the system may contain either the current IC, the active backup IC or a reserve backup IC. As shown in FIG. 21, if database network 100 has two or more coservers, then database system 5 will include an active backup IC 520. Active backup IC 520 is shown running on coserver 102e, but active backup IC could run on any coserver except coserver 102c where IC 110 is running. If network 100 has three or more coservers, then database system 5 will include an active backup ICs 520, and one or more reserve backup ICs 525a, 525b. Reserve ICs 525a, b, c, f, and g may run on any coserver not already running IC 110 or active backup IC 520, such as coservers 102a and 102g, respectively. If active backup IC 520 should ever fail, a reserve backup IC will be activated. This achieves faster response in the event that IC 110 is disabled.

At the end of each master interval, transaction state information in transaction state list 170 is sent from IC 110 to active backup IC 520 in a "backup message" 530. Active backup IC 520 copies this information to a local volatile buffer 22e and sends an "acknowledgement message" 535 to IC 110. Acknowledgement message 535 alerts IC 110 that active backup IC 520 received the transaction state information. However, active backup IC 520 does not write the transaction information to disk 22e at coserver 102e. IC 110 does not send closure message 120 to IPs 115a–115g until it has received acknowledgement message 535 from active backup IC 520 and until IC 110 has written the transaction state information to disk 22d. If IC 110 did not wait for acknowledgement message 535, the information in active backup IC 520 may be inconsistent with the information at the IPs and would be useless for recovery.

In the case of the failure of both IC 110 and active backup IC 550, the master interval information 577 on disk 24d is used to recover and reinitialize the system's transaction state by either restarted IC 110, restarted backup IC 550 or by the activation of one of the reserve backup ICs 525a–525g.

If IC 110 does not receive an acknowledgement 535 within a specified period of time, such as three seconds, then IC 110 may assume that active backup IC 520 has failed and promote one of the reserve backup ICs 525. Similarly, if active backup IC 520 does not receive the next backup IC message 530 message within a specified period of time, then active backup IC 520 may assume that IC 110 has failed and will attempt to assume its responsibilities.

Database system 5 includes a configuration manager 540, running on coserver 102g for example, to handle IC location changes and backup IC promotion. Requests to configuration manager 540 to change the location of IC 110 come only from active backup IC 520. If coserver 102e is recognized by manager 540 as the active backup IC, then the request will be granted and the backup IC on coserver 102e will become IC 110. Then a reserve backup IC will be promoted to active backup IC. If the requester is not the active backup IC at the time of the request, for example, if it was demoted earlier by the coordinator, the request will be denied and coserver 102e will be registered as a reserve backup IC.

In the preferred embodiment of the invention, a reserve backup IC can only be promoted directly to being IC 110 through the intermediate step of becoming an active backup IC. A reserve backup IC can become an active backup IC either by receiving global transaction state through message 530 or by recovering the previous logged global transaction state 577 of a failed IC 110. In an alternate embodiment, a reserve backup IC could also be directed to being IC 110 by exchanging IC READY and IC UPDATE messages with the IPs for purposes of collecting the current global transaction state for the system.

When active backup IC 520 becomes IC 110, it will use the information in memory 22e to initialize its structures with the latest transaction state, write the information to disk, and send an ICREADY message to alert all IPs 115a–115g that the location of IC 110 has changed. The IC UPDATE responses from the IPs are used for purposes of confirming the global transaction state of the new IC 110. Transaction processing should then be able to continue.

Only the configuration manager 540 can change the designation of a reserved backup IC as being IC 110 or the active backup IC. The configuration manager provides a single point of decision regarding both the promotion of a reserve backup IC to being the active backup IC and the previously described promotion of an active backup IC to become 110. This interaction with the configuration manager is necessary to prevent the IPs from receiving interval messages from two independent interval coordinators. This could occur if IC 110 believes active backup IC 520 is dead and requests a new active backup IC, and the active backup 520 thinks IC 110 has failed and so promotes itself to interval coordinator.

Any time that a coserver, such as coserver 102a, fails, that coserver will be de-registered by IC 110. When coserver 102a is restored, it will roll forward the database by replaying all the operations stored in transaction log 64a on disk 24a.

If any open transactions remain after IP 102a completes its roll forward based on transaction log 64a, IC 110 is consulted to determine how they should be resolved. IP 115a sends a RECOVERY message to IC 110, and IC 110 responds by accessing transaction state list 170 in memory 60d to find transactions in which IP 115a was a participant. Then IC 110 sends a RECOVERY REPLY message listing the committed transactions to IP 115a. Any transactions that remain open after taking action on the information transmitted by the RECOVERY REPLY message are aborted. After coserver 102a completes recovery, IP 115a will flush it transaction log 64a to disk 24a, and send a RECOVERY COMPLETE message to IC 110. Then IC 110 will clear the transaction information related to coserver 102a from transaction state list 170. Once all transactions are resolved, and the first distributed transaction begins to execute, IP 115a sends a READY message to IC 110, and IC 110 will re-register coserver 102a.

With the above described configuration, database system 5 can recover from failure scenarios as will be described below.

Referring to FIG. 9, if owner 130 fails before the transaction is committed by IC 110, IC 110 will include in the next interval message 120 an abort of any unresolved transactions of coserver 102c, and the transaction will be aborted on all participant coservers. During recovery, coserver 102c will abort the transaction.

If owner 130 fails after the transaction is committed by IC 110, the other participants in the transaction will be informed that the transaction is committed as normal. However, IC 110 will store the records in transaction state list 170 relating to coserver 102c until coserver 102c is restored. Eventually, during the recovery process, coserver 102c will send a message to IC 110 requesting the final state of any unresolved transactions. IC 110 will inform the IP, based on the information in list 170, that the transaction started by owner 130 has been committed. Coserver 102c will then write a commit log record in transaction log 64c.

If owner 130 fails after the close interval log record is flushed to disk 24c, then during recovery coserver 102c will simply use the information in transaction log 64c to complete the local commit processing of the transaction. No interaction by coserver 102c with IC 110 is necessary.

If helper 135a fails before completion message 140a is sent to owner 130, then coserver 102c will be notified that the coserver 102a has failed, and the transaction will be aborted. When coserver 102e notifies IC 110 of the abort of the transaction IC 110 will, as previously described, notify all participants of the transactions, excluding 102a, of the abort of the transaction. During recovery coserver 102a will abort the transaction.

If helper 135a fails after completion message 140a is sent to owner 130, but before IC 110 commits the transaction by flushing its log record to disk, then the transaction could still be in progress on other coservers 102b–102g. If owner 130 has not requested a commit before being notified of the failure of coserver 102a, then owner 130 will abort the transaction. This is treated as a normal transaction abort. If owner 130 has already requested a commit, then IC 110 will mark the transaction as aborted when it is notified that coserver 102a has failed. In the next interval message, IC 110 will alert all the other participants, including owner 130, of the abort. In both cases, coserver 102a will abort the transaction as part of recovery processing.

If helper 135a fails after IC 110 commits the transaction, but before the commit log record in transaction log 64a is flushed to disk, then other participants in the transaction will be informed that the transaction is committed as normal. However, IC 110 will store the transaction in list 170 until coserver 102a is restored. Eventually, during the recovery process, coserver 102a will send a message to IC 110 requesting the final state of its unresolved transactions. IC 110 will access list 170 and inform coserver 102a that the transaction has been committed. Coserver 102a will then write a commit log record in transaction log 64a.

If helper 135a fails after the commit log record is flushed to disk 22a, coserver 102a will use its own transaction log 64a to determine whether the transaction is committed. No interaction with the IC is necessary.

If IC 110 fails, then no distributed transactions can be committed or aborted until the active backup IC has assumed the role of coordinator or the coserver hosting the coordinator is back on line. In either case the saved global transaction state is restored and an ICREADY message is sent to all participants registered with the IC.

If owner 130 and helpers 135a fail, the situation is treated the same as if one or the other had failed.

If there is a full system failure (all coservers 102a–102g fail), then when database system 5 comes back up, the saved transaction state 577 in list 170 is restored from disk 22d and IC 110 sends an ICREADY message to all coservers that were registered as active or idle at the time of the crash. IC 110 then waits for the replies. Each coserver will send a request for recovery information to resolve any transactions still open after completing the roll forward phase of its recovery.

If no active backup IC is available and the coserver running IC 110 fails, one of two actions will occur. If the database system 5 supports coserver restart, then the termination of all distributed transactions will be delayed until the IC can be restarted. If coserver restart is not possible, then database system 5 will not be able to process transactions until IC 110 or a backup IC is restarted.

Some transactions span multiple database systems. In the event of such a transaction, the database system of the present invention must interact with an external database system. The external database system might use a different commitment protocol, such as the standard two-phase commit protocol. Transactions which require database system 100 to interact with an external database system will be referred to as external transactions. In the event of an external transaction, the commitment protocol of the present invention must be able to satisfy the semantic requirements of two-phase commit.

Database system 100 may treat external transactions as normal internal transaction, with two exceptions. First, database system 100 provides a mapping between a global external transaction identifier which is used by the external database system, and an internal identifier which is used by the IPs and the IC of database system 100.

Second, if an external transaction enters the REQUEST COMMIT state, then after each internal participant in the external transaction sends a closure message, the IC places the external transaction into a PAUSED state. After an external transaction is in the PAUSED state, database system 100 can return a success status in response to an external request to prepare the external transaction. Subsequently, in response to an external request, the IC can change the status of the external transaction to ABORT or COMMIT.

In review, the present invention is a method for committing a distributed transaction in a distributed database system on a computer network. The distributed database system is comprised of multiple database servers called coservers. There may be more than one coserver on a computer or node in the computer network. An interval coordinator (IC) resides on one of the coservers, and an interval participant (IP) resides on each coserver. The IC periodically sends out a message called an "interval message" to each IP. The interval message contains an interval identifier that is increased by the IC with each successive interval and alerts the IP that a new interval has begun. Each IP maintains an interval counter that designates its local interval. In response to the interval message, the IP sets its interval counter to the value from the interval identifier, and flushes the transaction log associated with its coserver to non-volatile storage. After flushing the log, the IP sends a message called a "closure message" back to the IC.

Each coserver which is involved in distributed transaction is a participant in the transaction. The participant where the transaction originated is called the "owner", and the other participants are called "helpers". When a helper completes a database update, it sends a response message to the owner which is tagged with the value of its interval counter.

The owner stores the most recent tag associated with an update of the transaction by any participant. When a user (or transaction owner) requests that a transaction be committed, the owner transmits a request to commit the transaction to the IC along with the stored tag and a list of the coservers that participated in the transaction. The request may be sent in the next closure message.

The IC stores a record for any interval until all of the IPs sent a closure message for that interval. The IC can commit a transaction once it determines that all of the participants in the transaction have sent a closure message for an interval that is equal to or more recent than the stored tag for that transaction. Once the IC determines that a transaction can be committed, it writes a commit record for the transaction to the IC's log. A list of the transactions that have been committed is included in the next interval message. Because the IC's log is flushed to non-volatile storage before the interval message is sent, the recoverability of the IC's decision to commit a transaction is ensured.

In response to receiving an interval message containing a list of transactions to commit, each coserver enters a commit log record in its transaction log for each transaction in which it was a participant. Once all of the participants in the transaction have sent a closure message for that interval containing a transaction's commit notification, the IC may forget about the transaction.

This commit protocol will, particularly in multi-node parallel-processing computers, significantly reduce the number of messages exchanged and thereby improve the performance of a distributed database system.

The present invention has been described in terms of a preferred embodiment. The invention, however, is not limited to the embodiment depicted and described. Rather, the scope of the invention is defined by the appended claims.

What is claimed is:

1. A method for determining commitment of a distributed transaction in a distributed database system, said distributed transaction including an owner and a helper, comprising:

running an interval coordinator;

running a plurality of coservers, the owner associated with a first coserver and the helper associated with a second coserver;

associating each of said coservers with a transaction log;

sending from the interval coordinator to each of the coservers a succession of interval messages, said interval messages representing a succession of temporal periods;

flushing the transaction log associated with said coserver to non-volatile storage in response to receiving one of said interval messages;

maintaining a state in each of the coservers identifying a most recently received interval message;

transmitting a closure message from each of the coservers to the interval coordinator after that coserver flushes its associated transaction log;

transmitting a request message from the owner to the helper identifying an operation in said distributed transaction for said second coserver to execute;

transmitting a completion message from the helper to the owner upon execution of the operation, said completion message including a tag identifying the most recently received interval message of said second coserver;

after receiving said completion message, transmitting an eligibility message for the transaction from the owner to the interval coordinator;

after receiving the eligibility message from the owner and a closure message from the helper, writing a commit state for the transaction to stable storage; and after writing the commit state, sending from the interval coordinator to the owner and helper a commit message for the transaction.

2. The method of claim 1 wherein said commit message accompanies said interval message.

3. The method of claim 1 wherein said eligibility message accompanies said closure message.

4. The method of claim 1 wherein said eligibility message is sent if the state of the owner identifies the same interval message as the tag or if the state of the owner identifies an earlier interval message than the tag.

5. The method of claim 1 wherein the transaction includes a plurality of helpers, the owner transmits a plurality of request messages from to the plurality of helpers, each helper transmits a completion message to the owner, and interval coordinator sends a commit message to the owner and each of the helpers after receiving a closure message from each of the helpers.

6. The method of claim 1 wherein said commit message is an instruction to commit.

7. The method of claim 1 wherein said commit message is an instruction to abort.

8. The method of claim 1 wherein each coserver has a transaction log.

9. A computer program for committing a distributed transaction in a distributed database system, said distributed transaction including an owner and a helper, said computer program tangibly stored on a computer-readable medium, comprising instructions for causing a computer system to:

run an interval coordinator;

run a plurality of coservers, the owner associated with a first coserver and the helper associated with a second coserver;

associate said coservers with at least one transaction log;

send from the interval coordinator to each of the coservers a succession of interval messages;

flush the transaction log to non-volatile storage in response to receiving one of said interval messages;

maintain a state in each of the coservers identifying a most recently received interval message;

transmit a closure message from each of the coservers to the interval coordinator after flushing the transaction log;

transmit a request message from the owner to the helper identifying an operation in said distributed transaction for said second coserver to execute;

transmit a completion message from the helper to the owner upon execution of the operation, said completion message including a tag identifying the most recently received interval message of said second coserver;

after receiving said completion message, transmit an eligibility message for the transaction from the owner to the interval coordinator;

after receiving the eligibility message from the owner and a closure message from the helper, write a commit state for the transaction to stable storage; and after writing the commit state, send from the interval coordinator to the owner and helper a commit message for the transaction.

* * * * *